United States Patent
Dong et al.

(10) Patent No.: US 12,524,164 B2
(45) Date of Patent: Jan. 13, 2026

(54) MEMORY DEVICE, MEMORY SYSTEM AND OPERATION METHOD THEREOF, AND ELECTRONIC APPARATUS

(71) Applicant: YANGTZE MEMORY TECHNOLOGIES CO., LTD., Wuhan (CN)

(72) Inventors: WenWen Dong, Wuhan (CN); Yahai Liu, Wuhan (CN); Lu Guo, Wuhan (CN); Wei Huang, Wuhan (CN); Weijun Wan, Wuhan (CN)

(73) Assignee: Yangtze Memory Technologies Co., Ltd., Hubei (CN)

( * ) Notice: Subject to any disclaimer, the term of this patent is extended or adjusted under 35 U.S.C. 154(b) by 0 days.

(21) Appl. No.: 18/634,681

(22) Filed: Apr. 12, 2024

(65) Prior Publication Data
US 2025/0217043 A1    Jul. 3, 2025

(30) Foreign Application Priority Data
Jan. 3, 2024    (CN) .......................... 202410008323.9

(51) Int. Cl.
*G06F 12/00* (2006.01)
*G06F 3/06* (2006.01)
*G11C 16/04* (2006.01)

(52) U.S. Cl.
CPC .......... *G06F 3/0619* (2013.01); *G06F 3/0659* (2013.01); *G06F 3/0679* (2013.01); *G11C 16/0483* (2013.01)

(58) Field of Classification Search
CPC . G11C 16/3459; G11C 16/0483; G11C 16/08; G11C 16/10; G06F 12/0246
USPC .......................................................... 711/103
See application file for complete search history.

(56) References Cited

U.S. PATENT DOCUMENTS

| | | | |
|---|---|---|---|
| 11,955,184 B2 * | 4/2024 | Guo .................... | G11C 16/3459 |
| 2015/0003151 A1 * | 1/2015 | Lee ..................... | G11C 11/5628 |
| | | | 365/185.02 |
| 2015/0146486 A1 * | 5/2015 | Wu .................... | G11C 16/3459 |
| | | | 365/185.04 |
| 2018/0321873 A1 * | 11/2018 | Liu .......................... | G11C 8/06 |
| 2022/0044737 A1 * | 2/2022 | Khayat ............... | G11C 11/5642 |

* cited by examiner

*Primary Examiner* — Mardochee Chery
(74) *Attorney, Agent, or Firm* — Conley Rose, P.C.

(57) ABSTRACT

The present disclosure provides a memory device and an operation method thereof, a memory system and an operation method thereof, and an electronic apparatus. The memory device includes a memory array and a peripheral circuit coupled with the memory array; the peripheral circuit is configured to: in response to a characteristic parameter setting command, receive a characteristic parameter of an erased page checking operation, wherein the characteristic parameter of the erased page checking operation includes at least a read voltage compensation parameter of the erased page checking operation; and in response to an erased page checking command, perform the erased page checking operation on the memory array based on the characteristic parameter of the erased page checking operation.

20 Claims, 13 Drawing Sheets

| PARAMETER | 7 | 6 | 5 | 4 | 3 | 2 | 1 | 0 |
|---|---|---|---|---|---|---|---|---|
| A1 | | | | EPC_offset_SLC | | | | |
| A2 | | | | EPC_offset_TLC | | | | |
| A3 | | | | RESERVED | | | | |
| A4 | | | | RESERVED | | | | |

FIG. 7

| DATA | Resolution (10 mV/step) |
|---|---|
| 00h | 0V |
| 01h | 10 mV |
| 02h | 20 mV |
| 03h | 30 mV |
| ... | ... |
| 7Eh | 1.27V |
| 7Fh | 1.28V |
| 80h | - 1.28V |
| 81h | - 1.27V |
| 82h | - 1.26V |
| ... | ... |
| FDh | - 30 mV |
| FEh | - 20 mV |
| FFh | - 10 mV |

FIG. 8

MEMORY DEVICE, MEMORY SYSTEM AND OPERATION METHOD THEREOF, AND ELECTRONIC APPARATUS

CROSS-REFERENCE TO RELATED APPLICATIONS

The present application claims priority to Chinese Patent Application No. 2024100083239, which was filed Jan. 3, 2024, is titled "MEMORY DEVICE, MEMORY SYSTEM AND OPERATING METHOD, ELECTRONIC EQUIPMENT," and is hereby incorporated herein by reference in its entirety.

TECHNICAL FIELD

The present disclosure relates to the technical field of semiconductors, and in particular, to a memory device and an operation method thereof, a memory system and an operation method thereof, and an electronic apparatus.

BACKGROUND

In addition to performing of normal read, write and erase, a memory device also needs to have the capability to cope with special situations, such as performing detection of a read disturbance page, searching for a last programmed page when power failure occurs, etc. However, if a logic circuit coping with each situation is added in control logic of the memory device, the area of the circuit of control logic is enlarged, not facilitating the miniaturization development of the memory device.

SUMMARY

Examples of the present disclosure provide a memory device and an operation method thereof, a memory system and an operation method thereof, and an electronic apparatus.

In a first aspect, the examples of the present disclosure provide a memory device; the memory device comprises a memory array and a peripheral circuit coupled with the memory array; and the peripheral circuit is configured to: in response to a characteristic parameter setting command, receive a characteristic parameter of an erased page checking operation, wherein the characteristic parameter of the erased page checking operation comprises at least a read voltage compensation parameter of the erased page checking operation; and in response to an erased page checking command, perform the erased page checking operation on the memory array based on the characteristic parameter of the erased page checking operation.

In one optional implementation, the memory device comprises a characteristic parameter storage region, wherein the characteristic parameter storage region is located in the memory array or in the peripheral circuit; and the peripheral circuit is configured to: after receiving the characteristic parameter of the erased page checking operation, store the characteristic parameter of the erased page checking operation to the characteristic parameter storage region; and in response to the erased page checking command, perform the erased page checking operation on the memory array based on the characteristic parameter of the erased page checking operation in the characteristic parameter storage region.

In one optional implementation, the characteristic parameter storage region comprises a first storage region; the characteristic parameter setting command comprises a first parameter setting command; and the peripheral circuit is configured to: in response to the first parameter setting command, receive a first voltage compensation parameter and a second voltage compensation parameter, wherein the first voltage compensation parameter comprises the read voltage compensation parameter performing the erased page checking operation on a single-level cell, and the second voltage compensation parameter comprises the read voltage compensation parameter performing the erased page checking operation on a multi-level cell; and store the first voltage compensation parameter and the second voltage compensation parameter to the first storage region.

In one optional implementation, the peripheral circuit is configured to: receive the erased page checking command performing the erased page checking operation on a target page, wherein the target page is a memory page that is not programmed in the memory array or a memory page in a last programmed block in the memory array when power failure of the memory device occurs, and the last programmed block is a memory block that is undergoing a program operation when power failure of the memory device occurs; in response to the erased page checking command, acquire the first voltage compensation parameter or the second voltage compensation parameter as the read voltage compensation parameter of the erased page checking operation from the first storage region based on a type of a memory cell in the target page; and add a voltage compensation value corresponding to the read voltage compensation parameter of the erased page checking operation and a default read voltage to obtain a read voltage for performing the erased page checking operation.

In one optional implementation, the target page is the memory page that is not programmed in the memory array; and a voltage compensation value corresponding to the first voltage compensation parameter and a voltage compensation value corresponding to the second voltage compensation parameter both are negative values.

In one optional implementation, the target page is the memory page in the last programmed block in the memory array when power failure of the memory device occurs; and a voltage compensation value corresponding to the first voltage compensation parameter and a voltage compensation value corresponding to the second voltage compensation parameter both are positive values.

In one optional implementation, the characteristic parameter of the erased page checking operation further comprises a fail bit allowance parameter of the erased page checking operation; the characteristic parameter storage region further comprises a second storage region; the characteristic parameter setting command further comprises a second parameter setting command; and the peripheral circuit is further configured to: in response to the second parameter setting command, receive the fail bit allowance parameter of the erased page checking operation, and store the fail bit allowance parameter of the erased page checking operation to the second storage region.

In one optional implementation, when the target page is the memory page that is not programmed in the memory array, the fail bit allowance parameter corresponds to the first number of bits; when the target page is the memory page in the last programmed block in the memory array when power failure of the memory device occurs, the fail bit allowance parameter corresponds to the second number of bits; and the second number of bits is greater than the first number of bits.

In one optional implementation, the peripheral circuit is further configured to: in response to the erased page checking command, acquire the fail bit allowance parameter of the erased page checking operation in the second storage region; apply the read voltage for the erased page checking operation to a word line corresponding to the target page, and obtain the number of fail bits of the target page; and determine a result of the erased page checking operation based on the number of fail bits of the target page and the fail bit allowance parameter, and send the result of the erased page checking operation.

In one optional implementation, the characteristic parameter storage region is located in the peripheral circuit, and the characteristic parameter storage region comprises a plurality of registers.

In a second aspect, the examples of the present disclosure provide a memory system, and the memory system comprises at least one memory device and a memory controller coupled with the memory device; the memory controller is configured to: receive a characteristic parameter of an erased page checking operation from a host, and send the characteristic parameter of the erased page checking operation and a characteristic parameter setting command to the memory device, wherein the characteristic parameter of the erased page checking operation comprises at least a read voltage compensation parameter of the erased page checking operation; the memory device is configured to, in response to the characteristic parameter setting command, receive the characteristic parameter of the erased page checking operation; the memory controller is further configured to send an erased page checking command to the memory device; and the memory device is configured to, in response to the erased page checking command, perform the erased page checking operation based on the characteristic parameter of the erased page checking operation, and send a result of the erased page checking operation to the memory controller.

In one optional implementation, the memory device is further configured to: after receiving the characteristic parameter of the erased page checking operation, store the characteristic parameter of the erased page checking operation to a characteristic parameter storage region in the memory device; and in response to the erased page checking command, perform the erased page checking operation on the memory array based on the characteristic parameter of the erased page checking operation in the characteristic parameter storage region.

In one optional implementation, a target page of the erased page checking operation is a memory page that is not programmed in the memory device; and the memory controller is further configured to: send, to the memory device, a read voltage compensation parameter that corresponds to a voltage compensation value that is a negative value.

In one optional implementation, a target page of the erased page checking operation is a memory page in a last programmed block in the memory device when power failure occurs; the last programmed block is a memory block that is undergoing a program operation when power failure of the memory device occurs; and the memory controller is further configured to: send, to the memory device, a read voltage compensation parameter that corresponds to a voltage compensation value that is a positive value.

In one optional implementation, the memory controller is further configured to: when the target page of the erased page checking operation is the memory page that is not programed in the memory device, send a fail bit allowance parameter corresponding to the first number of bits to the memory device; and when the target page is the memory page in the last programmed block in the memory device when power failure occurs, send a fail bit allowance parameter corresponding to the second number of bits to the memory device, wherein the second number of bits is greater than the first number of bits.

In one optional implementation, the memory controller is configured to: determine the target page as a read disturbance page when the target page of the erased page checking operation is the memory page that is not programed in the memory device and the target page does not pass the erased page checking operation; and before sending a command indicating the performing of a program operation on the read disturbance page, send a command indicating the performing of an erase operation on the read disturbance page.

In one optional implementation, the memory controller is configured to: determine the target page as a last programmed page when power failure occurs, when the target page of the erased page checking operation is the memory page in the last programmed block in the memory device when power failure occurs and the target page does not pass the erased page checking operation; and send a command indicating reprogramming of the last programmed page when power failure occurs.

In a third aspect, the examples of the present disclosure provide an electronic apparatus, comprising: the memory system in any one of the above-mentioned examples; and a host coupled with the memory system and configured to send a characteristic parameter of an erased page checking operation to the memory system.

In a fourth aspect, the examples of the present disclosure provide an operation method of a memory device, wherein the memory device comprises a memory array and a peripheral circuit coupled with the memory array; and the operation method comprises: in response to a characteristic parameter setting command, receiving a characteristic parameter of an erased page checking operation, wherein the characteristic parameter of the erased page checking operation comprises at least a read voltage compensation parameter of the erased page checking operation; and in response to an erased page checking command, performing the erased page checking operation on the memory array based on the characteristic parameter of the erased page checking operation.

In one optional implementation, the operation method further comprises: after receiving the characteristic parameter of the erased page checking operation, storing the characteristic parameter of the erased page checking operation to a characteristic parameter storage region in the memory device; and in response to the erased page checking command, performing the erased page checking operation on the memory array based on the characteristic parameter of the erased page checking operation in the characteristic parameter storage region.

In one optional implementation, the characteristic parameter setting command comprises a first parameter setting command; and in response to the characteristic parameter setting command, receiving the characteristic parameter of the erased page checking operation and storing the characteristic parameter of the erased page checking operation to the characteristic parameter storage region comprises: in response to the first parameter setting command, receiving a first voltage compensation parameter and a second voltage compensation parameter, wherein the first voltage compensation parameter comprises the read voltage compensation parameter performing the erased page checking operation on a single-level cell, and the second voltage compensation parameter comprises the read voltage compensation parameter performing the erased page checking operation on a multi-level cell; and storing the first voltage compensation parameter and the second voltage compensation parameter to the first storage region in the characteristic parameter storage region.

In one optional implementation, in response to the erased page checking command, performing the erased page checking operation on the memory array based on the characteristic parameter of the erased page checking operation in the characteristic parameter storage region comprises: receiving the erased page checking command performing the erased page checking operation on a target page, wherein the target page is a memory page that is not programmed in the memory array or a memory page in a last programmed block in the memory array when power failure of the memory device occurs, and the last programmed block is a memory block that is undergoing a program operation when power failure of the memory device occurs; in response to the erased page checking command, acquiring the first voltage compensation parameter or the second voltage compensation parameter as the read voltage compensation parameter of the erased page checking operation from the first storage region based on a type of a memory cell in the target page; and adding a voltage compensation value corresponding to the read voltage compensation parameter of the erased page checking operation and a default read voltage to obtain a read voltage for performing the erased page checking operation.

In one optional implementation, the characteristic parameter setting command further comprises a second parameter setting command; and in response to the characteristic parameter setting command, receiving the characteristic parameter of the erased page checking operation and storing the characteristic parameter of the erased page checking operation to the characteristic parameter storage region further comprises: in response to the second parameter setting command, receiving a fail bit allowance parameter of the erased page checking operation, and storing the fail bit allowance parameter of the erased page checking operation to the second storage region in the characteristic parameter storage region.

In one optional implementation, in response to the erased page checking command, performing the erased page checking operation on the memory array based on the characteristic parameter of the erased page checking operation in the characteristic parameter storage region further comprises: in response to the erased page checking command, acquiring the fail bit allowance parameter of the erased page checking operation in the second storage region; applying the read voltage for the erased page checking operation to a word line corresponding to the target page, and obtaining the number of fail bits of the target page; and determining a result of the erased page checking operation based on the number of fail bits of the target page and the fail bit allowance parameter, and sending the result of the erased page checking operation.

In a fifth aspect, the examples of the present disclosure provide an operation method of a memory system, wherein the memory system comprises at least one memory device and a memory controller coupled with the memory device; and the operation method comprises: by the memory controller, receiving a characteristic parameter of an erased page checking operation from a host, and sending the characteristic parameter of the erased page checking operation and a characteristic parameter setting command to the memory device, wherein the characteristic parameter of the erased page checking operation comprises at least a read voltage compensation parameter of the erased page checking operation; in response to the characteristic parameter setting command, receiving, by the memory device, the characteristic parameter of the erased page checking operation; sending, by the memory controller, an erased page checking command to the memory device; and by the memory device, in response to the erased page checking command, performing the erased page checking operation based on the characteristic parameter of the erased page checking operation, and sending a result of the erased page checking operation to the memory controller.

In the technical solutions provided by the present disclosure, the memory device comprises the characteristic parameter storage region, the peripheral circuit may, in response to the characteristic parameter setting command, receive the characteristic parameter of the erased page checking operation and store the characteristic parameter of the erased page checking operation in the characteristic parameter storage region, and may, in response to the erased page checking command, perform the erased page checking operation based on the characteristic parameter of the erased page checking operation. The characteristic parameter of the erased page checking operation comprises a voltage compensation characteristic parameter and the fail bit allowance parameter; the characteristic parameter of the erased page checking operation may be set based on different application scenarios; when the target page is the memory page that is not programmed, the voltage compensation value corresponding to the voltage compensation characteristic parameter is the negative value, the read voltage for performing the erased page checking operation may be lower than the default read voltage, and the first number of bits corresponding to the fail bit allowance parameter is smaller, such that the accuracy of detecting the read disturbance page may be improved; and when the target page is the memory page in the last programmed block when power failure of the memory device occurs, the voltage compensation value corresponding to the voltage compensation characteristic parameter is the positive value, the read voltage for performing the erased page checking operation may be higher than the default read voltage, and the second number of bits corresponding to the fail bit allowance parameter is large, such that the accuracy of searching for the last programmed page when power failure of the memory device occurs may be improved. Therefore, the flexibility of the erased page checking operation may be improved to make the erased page checking operation able to be applied to different scenarios, and the reliability of the memory device may be improved without increasing an area of a logic circuit.

BRIEF DESCRIPTION OF THE DRAWINGS

FIG. 7 is a characteristic parameter table stored in a first storage region provided by examples of the present disclosure.

FIG. 8 is a value comparison table of a read voltage compensation parameter provided by examples of the present disclosure.

DETAILED DESCRIPTION

Figure 1:
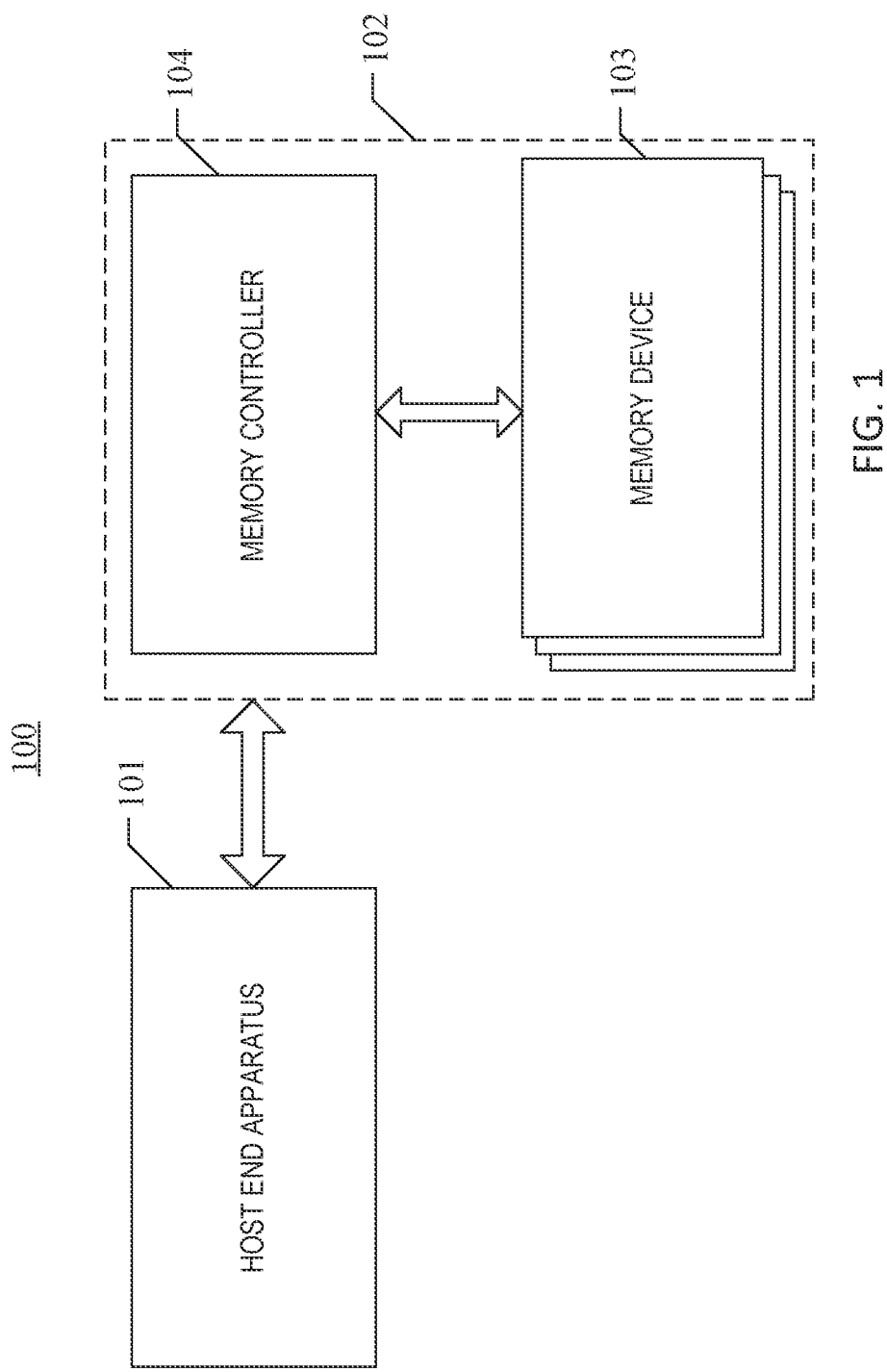
FIG. 1 is a schematic diagram of an example system having a memory system provided by examples of the present disclosure.

Example embodiments disclosed in the present disclosure are described in more detail with reference to drawings. Although the example embodiments of the present disclosure are shown in the drawings, it should be understood that the present disclosure may be implemented in various forms and should not be limited by the embodiments described here. These embodiments are provided for more thorough understanding of the present disclosure, and to fully convey a scope disclosed in the present disclosure to a person skilled in the art.

In the following descriptions, a lot of details are given in order to provide the more thorough understanding of the present disclosure. However, it is apparent to a person skilled in the art that the present disclosure may be implemented without one or more of these details. In other examples, in order to avoid confusion with the present disclosure, some technical features well-known in the field are not described. Namely, all the features of the actual embodiments are not described here, and well-known functions and structures are not described in detail.

In the accompanying drawings, like reference numerals denote like elements throughout the specification.

It should be understood that, spatially relative terms, such as "beneath", "below", "lower", "under", "over", "upper", etc., may be used herein for ease of description to describe the relationship between one element or feature and other elements or features as illustrated in the figures. It should be understood that, the spatially relative terms are intended to further encompass different orientations of a device in use or operation in addition to the orientation depicted in the figures. For example, if a device in the drawings is turned over, then an element or a feature described as "below other elements", or "under other elements", or "beneath other elements" will be orientated to be "above" the other elements or features. Thus, the example terms, "below" and "beneath", may comprise both upper and lower orientations. The device may be orientated otherwise (rotated by 90 degrees or other orientations), and the spatially descriptive terms used herein are interpreted accordingly.

The terms used herein are only intended to describe the examples, and are not used as limitations of the present disclosure. As used herein, unless otherwise indicated expressly in the context, "a", "an" and "the" in a singular form are also intended to comprise a plural form. It should also be understood that the terms "consist of" and/or "comprise", when used in this specification, determine the presence of the feature, integer, step, operation, element and/or component, but do not preclude the presence or addition of one or more of other features, integers, steps, operations, elements, components, and/or groups. As used herein, the term "and/or" comprises any or all combinations of the listed relevant items.

A memory system in examples of the present disclosure includes, but is not limited to, a memory system comprising a three-dimensional NAND memory. For ease of understanding, the memory system provided by the present disclosure is described by using the memory system comprising the three-dimensional NAND memory as an example.

FIG. 1 is a schematic diagram of an example system having a memory system provided by examples of the present disclosure. In examples of the present disclosure, the system 100 may comprise a mobile phone, a desktop computer, a laptop computer, a tablet computer, a vehicle computer, a gaming console, a printer, a positioning apparatus, a wearable electronic apparatus, a smart sensor, a Virtual Reality (VR) apparatus, an Augmented Reality (AR) apparatus, or any other suitable electronic apparatus having a memory therein. As shown in FIG. 1, the system 100 may comprise a host end apparatus 101 and a memory system 102, and the memory system 102 may comprise one or more memory devices 103 and a memory controller 104. The host end apparatus 101 may comprise a processor of an electronic apparatus, such as a Central Processing Unit (CPU), or a System on Chip (SoC), such as an Application Processor (AP). The host end apparatus 101 may be configured to send or receive data to or from the memory system 102.

In some implementations, the memory controller 104 is coupled to the memory device 103 and the host end apparatus 101, and is configured to control the memory device 103. The memory controller 104 may manage data stored in the memory device 103, and communicate with the host end apparatus 101. In some implementations, the memory controller 104 is designed for operating in a low duty-cycle environment, such as secure digital cards, Compact Flash Cards (CFC), Universal Serial Bus (USB) flash drives, or other media for use in electronic apparatuses, such as personal computers, digital cameras, mobile phones, etc. In some other implementations, the memory controller 104 is designed for operating in a high duty-cycle environment, for example, such as solid state drives or Embedded Multi-Media Cards (eMMCs).

In some examples, the memory controller 104 and the one or more memory devices 103 may be integrated in various types of memory apparatuses. That is to say, the memory system 102 may be implemented and packaged into different types of end electronic products.

Figure 3:
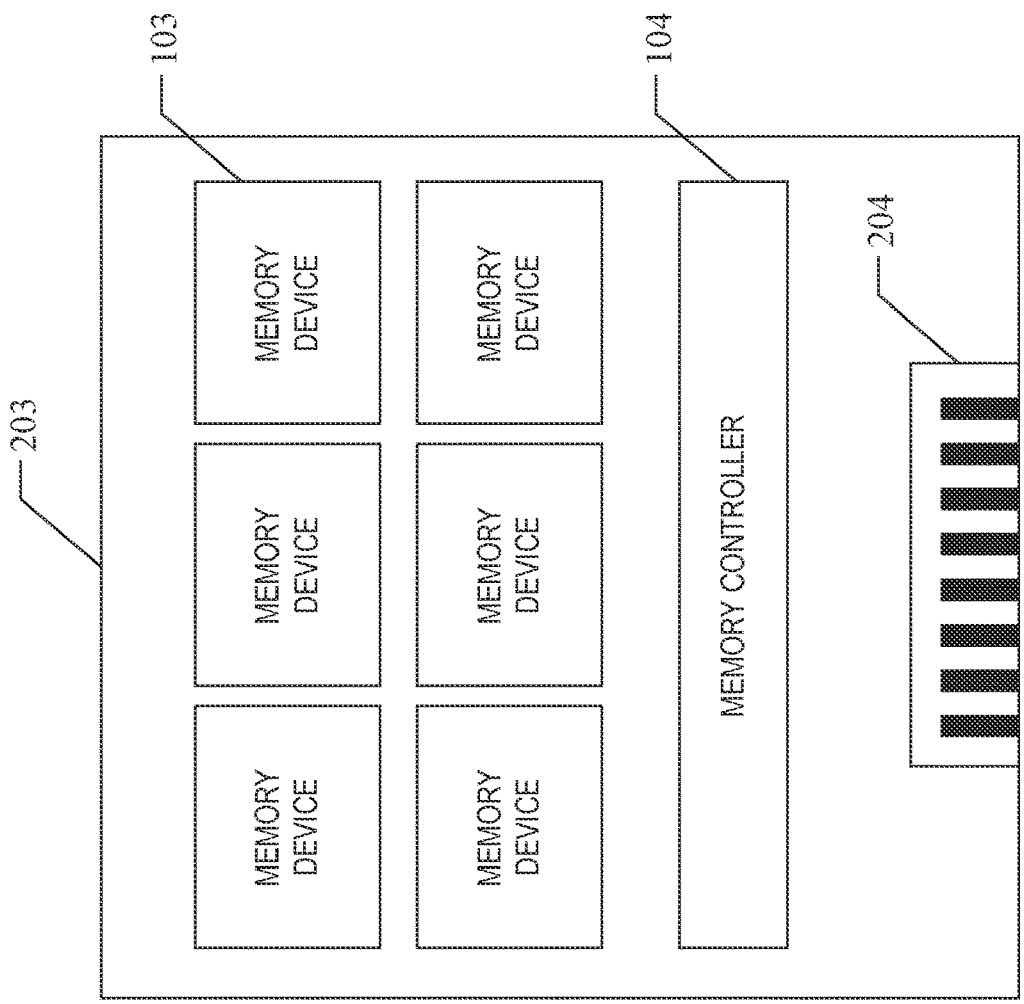
FIG. 3 is a schematic diagram of an example solid state drive having a memory system provided by examples of the present disclosure.
Figure 2:
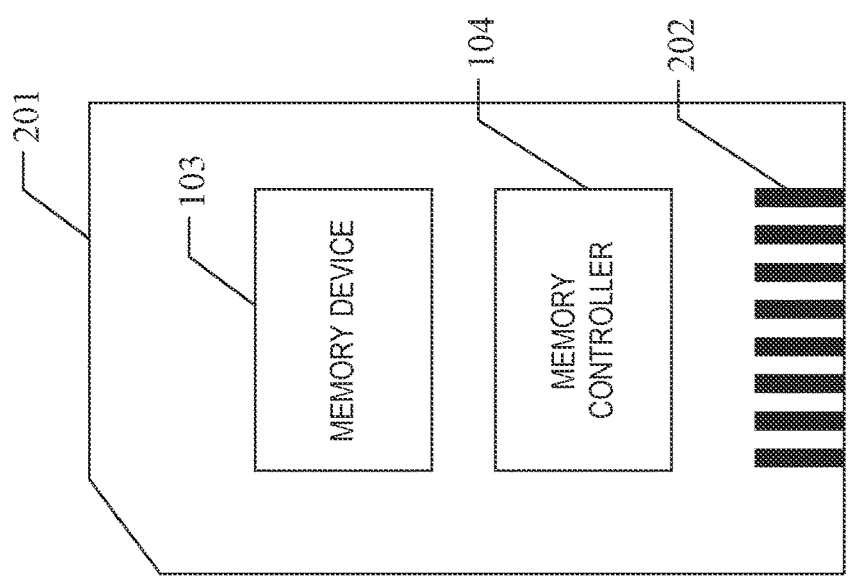
FIG. 2 is a schematic diagram of an example memory card having a memory system provided by examples of the present disclosure.

In an example shown in FIG. 2, the memory controller 104 and the single memory device 103 may be integrated into a memory card 201. The memory card 201 may be one of a compact flash card, a Smart Media Card (SMC), a Memory Stick (MS), a Multi-Media Card (MMC) such as RS-MMC, MMCmicro, eMMC, etc., a secure digital card such as a Mini SD card, a Micro SD card, an SDHC card, etc., or a universal flash card. The memory card 201 may further comprise a memory card connector 202 coupling the memory card 201 with the host end apparatus (e.g., the host end apparatus 101 in FIG. 1). In another example shown in FIG. 3, the memory controller 104 and the plurality of memory devices 103 may be integrated into an SSD 203. SSD 203 may also include an SSD connector 204 that couples SSD 203 with a host end apparatus (e.g., host end apparatus 101 in FIG. 1). In some implementations, the storage capacity and/or the operation speed of the SSD 203 are greater than the storage capacity and/or the operation speed of the memory card 201.

Figure 4:
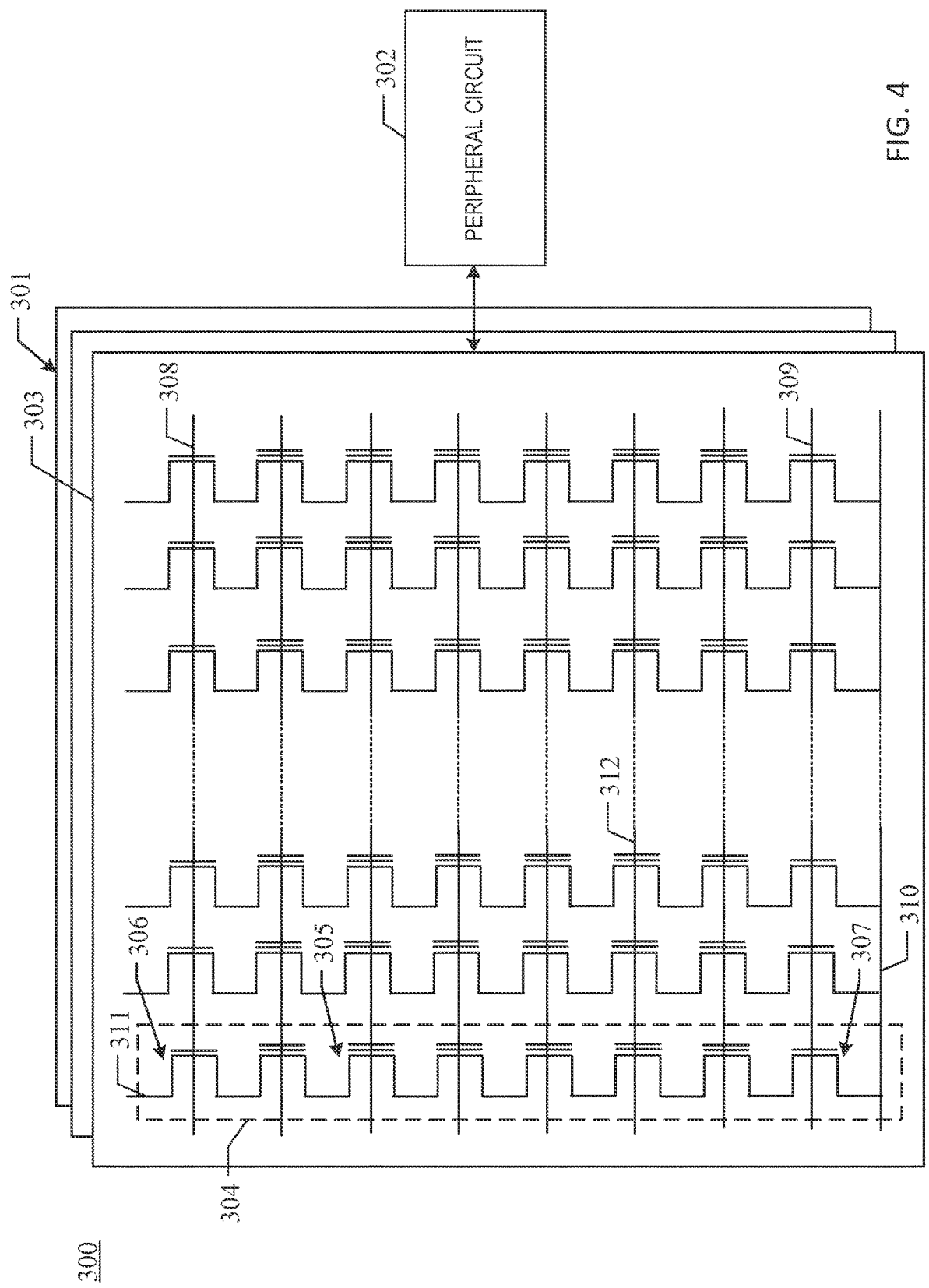
FIG. 4 is a schematic diagram of an example memory device comprising a peripheral circuit provided by examples of the present disclosure.

FIG. 4 is a schematic circuit diagram of an example memory device 300 comprising a peripheral circuit provided by examples of the present disclosure. The memory device 300 may be an example of the memory device 103 in FIG. 1. The memory device 300 may comprise a memory array 301 and a peripheral circuit 302 coupled to the memory array 301. For example, the memory array 301 is a three-dimensional NAND memory array, wherein a memory cell 305 is a NAND memory cell; the memory cell 305 is provided in the form of an array of memory strings 304; and each memory string 304 perpendicularly extends above a substrate (not shown). In some implementations, each memory string 304 may comprise a plurality of memory cells 305 coupled in series and stacked perpendicularly. Each memory cell 305 may hold a continuous analog value, such as a voltage or charge, which depends on the number of electrons trapped within a region of the memory cells 305. Each memory cell 305 may be either a floating gate type memory cell that comprises a floating gate transistor, or a charge trapping type memory cell that comprises a charge trapping transistor.

In some implementations, each memory cell 305 is a Single Level Cell (SLC) that has two possible memory states and thus may store one bit of data. For example, a first memory state "0" may correspond to a first voltage range, and a second memory state "1" may correspond to a second voltage range. In some implementations, each memory cell 305 is a multi-level cell that can store more than a single bit of data in four or more than four memory states, for example, a Multi-Level Cell (MLC) storing two bits per cell, a Triple Level Cell (TLC) storing three bits per cell, or a Quad-Level Cell (QLC) storing four bits per cell.

As shown in FIG. 4, each memory string 304 may comprise a Bottom Select Transistor (BST) 307 at a source terminal and a Top Select Transistor (TST) 306 at a drain terminal. The bottom select transistor 307 and the top select transistor 306 may be configured to activate a selected memory string 304 during read and program operations. In some implementations, sources of the memory strings 304 in the same memory block 303 may be coupled through a Common Source Line (CSL) 310. In other words, all the memory strings 304 in the same memory block 303 have Array Common Sources (ACS). According to some implementations, the top select transistor 306 of each memory string 304 is coupled to a respective Bit Line (BL) 311, and data may be read or written from the bit line 311 via an output bus (not shown). In some implementations, each memory string 304 is configured to be selected or unselected by applying a select voltage (e.g., a voltage above a threshold voltage of the top select transistor 306) or an unselect voltage (e.g., 0 V) to the respective top select transistor 306 via one or more Top Select Lines (TSL) 308 and/or by applying a select voltage (e.g., a voltage above a threshold voltage of the bottom select transistor 307) or an unselect voltage (e.g., 0 V) to the respective bottom select transistor 307 via one or more Bottom Select lines (BSL) 309.

As shown in FIG. 4, the memory strings 304 may be organized into a plurality of memory blocks 303, and each of the plurality of memory blocks 303 may have a common source line 310. In some implementations, each memory block 303 is a basic data unit for an erase operation, e.g., all of the memory cells 305 on the same memory block 303 are erased at the same time. In order to erase the memory cells 305 in the selected memory block, a common source line 310 coupled to the selected memory block as well as unselected memory blocks that are in the same plane as the selected memory block may be biased with an erase voltage. It is to be understood that in some examples, the erase operation may be performed at a half memory block level, a quarter memory block level, or a level having any suitable number of memory blocks or any suitable fractions of a memory block. The memory cells 305 of adjacent memory strings 304 may be coupled through word lines 312 that select which row of memory cells 305 is affected by the read and program operations.

In some examples, the peripheral circuit 302 may comprise any suitable analog, digital, and mixed signal circuits for realizing the operations of the memory array 301 by applying and sensing voltage signals and/or current signals to and from each target memory cell 305 via the bit line 311, the word line 312, the common source line 310, the bottom select line 309, and the top select line 308. The peripheral circuit 302 may comprise various types of peripheral circuits formed using a metal-oxide-semiconductor technology.

Figure 5:
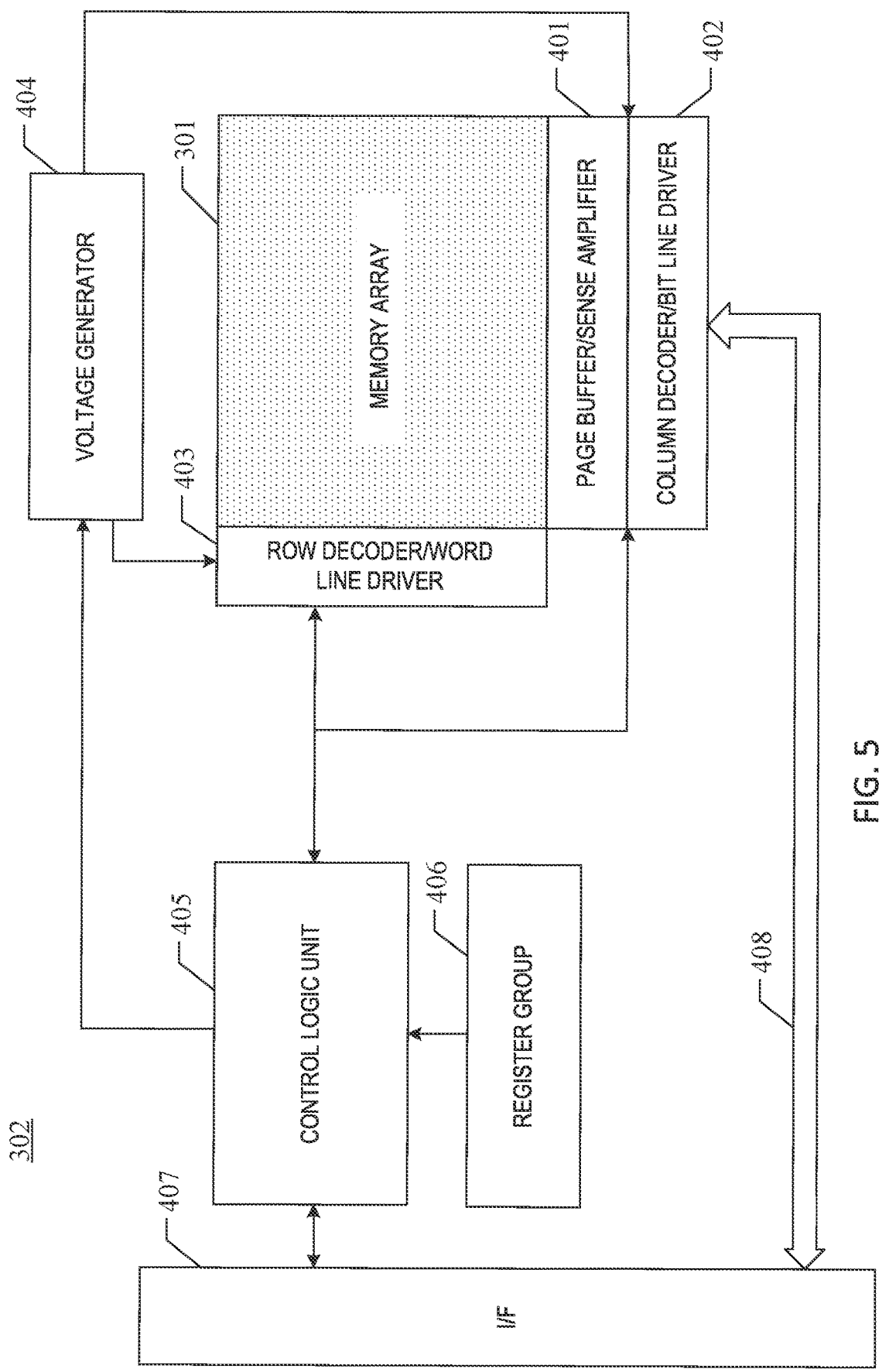
FIG. 5 is a schematic diagram of an example memory device comprising a memory array and a peripheral circuit provided by examples of the present disclosure.

FIG. 5 shows some example peripheral circuits. The peripheral circuit 302 comprises a page buffer/sense amplifier 401, a column decoder/bit line driver 402, a row decoder/word line driver 403, a voltage generator 404, a control logic 405, a register group 406, a flash interface 407, and a data bus 408. It is to be understood that in some examples, additional peripheral circuits not shown in FIG. 5 may be comprised as well.

The page buffer/sense amplifier 401 may be configured to read and program (write) data from and to the memory array 301 according to a control signal from the control logic 405. In one example, the page buffer/sense amplifier 401 may store one page of program data (write data) to be programmed into the memory array 301. In another example, the page buffer/sense amplifier 401 may perform a program verification operation to ensure that the data has been properly programmed into the memory cell coupled to the selected word line. In yet another example, the page buffer/sense amplifier 401 may also sense a low power signal from the bit line that represents a data bit stored in the memory cell, and amplifies a small voltage swing to a recognizable logic level in the read operation. The column decoder/bit line driver 402 may be configured to be controlled by the control logic 405 and select one or more memory strings by applying a bit line voltage generated from the voltage generator 404.

The row decoder/word line driver 403 may be configured to be controlled by the control logic 405, select/unselect the memory blocks of the memory array 301, and select/unselect the word lines of the memory blocks. The row decoder/word line driver 403 may be further configured to drive the word lines using a word line voltage generated from the voltage generator 404. In some examples, the row decoder/word line driver 403 may also select/unselect and drive the bottom select line and the top select line. As described below in detail, the row decoder/word line driver 403 is configured to perform the program operation on the memory cells that are coupled to (one or more) selected word line. The voltage generator 404 may be configured to be controlled by the control logic 405 and generate the word line voltage (such as, a read voltage, a program voltage, a pass voltage, a local voltage, a verify voltage, etc.), the bit line voltage, and a source line voltage to be supplied to the memory array 301.

The control logic 405 may be coupled to each peripheral circuit described above and configured to control the operation of each peripheral circuit. The register group 406 may be coupled to the control logic 405 and comprise a state register, a command register, and an address register for storing state information, a command operation code (OP code), and a command address for controlling the operation of each peripheral circuit. The flash interface 407 may be coupled to the control logic 405, and act as a control buffer to buffer and relay a control command received from the host end apparatus (not shown) to the control logic 405 and the state information received from the control logic 405 to the memory controller. The flash interface 407 may also be coupled to the column decoder/bit line driver 402 via the data bus 408 and act as a data I/O interface and a data buffer to buffer and relay the data to and from the memory array 301.

In some examples, in addition to performing of normal read, write and erase, the memory device also needs to have the capability to cope with special situations. For example, during a use process of the memory device, part of the memory pages that are not programmed may be subjected to relatively serious read disturbance, causing a threshold voltage of the memory cell to drift positively. When the memory pages subjected to read disturbance are programmed, part of the memory cells may be overprogrammed, e.g., the threshold voltages of the memory cells may exceed a preset threshold voltage range, resulting in program errors. For another example, power failure may suddenly occur during the operating of the memory device, and the memory device may be undergoing the program operation before power failure. In this case, after being re-powered, the memory device needs to be re-located to a page that is being programmed when power failure occurs, and re-programs the page. If a logic circuit coping with each situation is added in control logic of the memory device, the area of the circuit of control logic is enlarged, not facilitating the miniaturization development of the memory device. In this regard, the present disclosure provides the following implementations.

The present disclosure provides a memory device. Referring to FIG. 5, the memory device comprises a memory array 301 and a peripheral circuit coupled with the memory array 301; the peripheral circuit is configured to: in response to a characteristic parameter setting command, receive a characteristic parameter of an erased page checking operation, wherein the characteristic parameter of the erased page checking operation includes at least a read voltage compensation parameter of the erased page checking operation; and in response to an erased page checking command, perform the erased page checking operation on the memory array 301 based on the characteristic parameter of the erased page checking operation.

In the examples of the present disclosure, the peripheral circuit may be configured to: perform the erased page checking operation on the memory array 301. In an example, the peripheral circuit may perform the erased page checking operation on the memory array 301 after receiving the erased page checking command, comprising applying a read voltage for the erased page checking operation on a target page in the memory array 301, and determining, based on a read result, whether a memory cell in the target page is in an erased state. The erased page checking operation may be at least applied to two different scenarios. In the first scenario, the target page of the erased page checking operation may be a memory page that is not programmed in the memory array 301. If the target page is in the erased state, the target page is the memory page that is not subjected to read disturbance, otherwise, the target page is the memory that is subjected to read disturbance. Before a program operation is performed on the memory page, an erase operation needs to be first performed on the memory page to avoid program errors caused by read disturbance. In the second scenario, the target page of the erased page checking operation is a memory page in a last programmed block in the memory array 301 when power failure of the memory device occurs. If the target page is in the erased state, the target page is not the last programmed page in the last programmed block, otherwise, the target page is the last programmed page in the last programmed block, and after the memory device is re-powered, the program operation needs to be performed on the target page again.

It is to be noted that, in the examples of the present disclosure, the last programmed block may be an open block in the memory device, e.g., a memory block in which part of the memory pages have been programmed and part of the memory pages have not been programmed yet. In the last programmed block, in addition to the last programmed page, there is still a memory page that is virtually programmed by the memory device utilizing remaining power after sudden power failure occurs, and a threshold voltage of a memory cell in the virtually-programmed memory page is slightly higher than a threshold voltage of a memory cell in an erased state, but is lower than a threshold voltage of a memory cell in the last programmed page, such that when the last programmed page is searched, the last programmed page and the virtually-programmed memory page need to be distinguished.

In the examples of the present disclosure, the memory device comprises a characteristic parameter storage region, and the characteristic parameter storage region may be located in the memory array 301 or in the peripheral circuit.

In some examples, the peripheral circuit may be configured to: in response to the characteristic parameter setting command, receive the characteristic parameter of the erased page checking operation and store the characteristic parameter of the erased page checking operation to the characteristic parameter storage region; and in response to the erased page checking command, perform the erased page checking operation on the memory array 301 based on the characteristic parameter of the erased page checking operation in the characteristic parameter storage region.

In some examples, the characteristic parameter storage region may be located in the peripheral circuit and may be a part of the register group 406, e.g., the characteristic parameter storage region may comprise a plurality of registers. When the erased page checking operation is performed, a control logic 405 may rapidly acquire the characteristic parameter of the erased page checking operation from the characteristic parameter storage region, and perform the erased page checking operation on the target page in the memory array 301 based on the characteristic parameter of the erased page checking operation. In some other examples, the characteristic parameter storage region may also be located in the memory array 301, e.g., the characteristic parameter storage region may be a part of the memory array 301. In the following examples, the characteristic parameter storage region being located in the peripheral circuit is used as an example.

Figure 6:
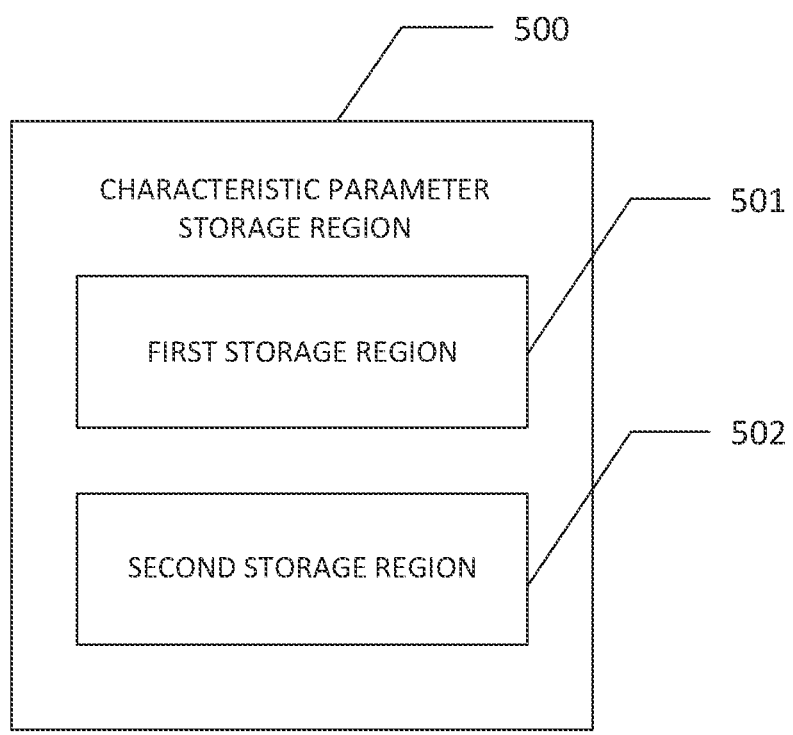
FIG. 6 is a schematic composition diagram of a characteristic parameter storage region provided by examples of the present disclosure.

FIG. 6 is a schematic composition diagram of a characteristic parameter storage region provided by examples of the present disclosure. As shown in FIG. 6, the characteristic parameter storage region 500 may comprise a first storage region 501 and a second storage region 502. The first storage region 501 may be configured to store a read voltage compensation parameter of the erased page checking operation, and the second storage region 502 may be configured to store a fail bit allowance parameter of the erased page checking operation.

In some examples, the peripheral circuit is configured to: in response to the first parameter setting command, receive a first voltage compensation parameter and a second voltage compensation parameter; and store a first voltage compensation parameter and a second voltage compensation parameter to the first storage region 501.

In some examples, FIG. 7 is a characteristic parameter table stored in the first storage region 501. As shown in FIG. 7, the read voltage compensation parameter of the erased page checking operation may comprise the first voltage compensation parameter A1 and the second voltage compensation parameter A2, wherein the first voltage compensation parameter A1 is a read voltage compensation parameter performing the erased page checking operation on a single-level cell (SLC), and the second voltage compensation parameter A2 is a read voltage compensation parameter performing the erased page checking operation on a multi-level cell, e.g., TLC. Herein, a retention parameter A3 and a retention parameter A4 are characteristic parameters that have not been used yet, and may have a value of 0 at each bit.

In some examples, FIG. 8 is a value comparison table of the read voltage compensation parameter. The first voltage compensation parameter A1 and the second voltage compensation parameter A2 may be any value in a first column of the value comparison table, a value of one read voltage compensation parameter in the first column corresponds to one voltage compensation value in a second column, and a difference between two adjacent voltage compensation values in the second column is 10 mV.

Figures 9, 10:
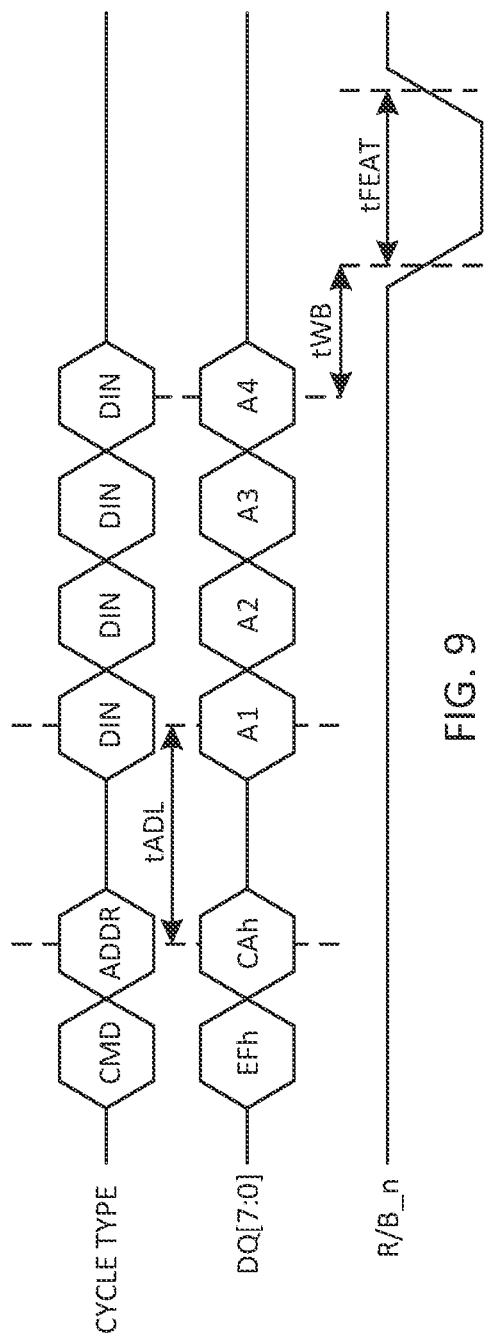
FIG. 9 is a timing diagram of performing parameter setting on a first storage region provided by examples of the present disclosure.
FIG. 10 is a characteristic parameter table stored in a second storage region provided by examples of the present disclosure.

In some examples, FIG. 9 is a timing diagram of performing parameter setting on the first storage region 501. The timing diagram comprises a data signal type Cycle Type, a data signal DQ[7:0], and a ready/busy signal R/B_n. The ready/busy signal R/B_n being in a high logic state ("1") indicates that the memory device is in a ready state, and the ready/busy signal R/B_n being in a low logic state ("0") indicates that the memory device is in a busy state. As shown in FIG. 9, the peripheral circuit is configured to: receive a first parameter setting command EFh in a command cycle (CMD), and receive an address CAh of the first storage region 501 in an address cycle (ADDR); after tADL, receive the first voltage compensation parameter A1, the second voltage compensation parameter A2, the retention parameter A3, and the retention parameter A4 in a data input cycle (DIN); and after tWB, store the first voltage compensation parameter A1, the second voltage compensation parameter A2, the retention parameter A3, and the retention parameter A4 in the first storage region 501 within tFEAT. Herein, the tADL is a time interval between an address input and a data input, the tWB is a time interval between the data input and the time when the ready/busy signal R/B_n is set to 0, and the tFEAT is a busy time for performing parameter setting.

In some examples, the peripheral circuit is configured to: in response to the erased page checking command, acquire the first voltage compensation parameter A1 or the second voltage compensation parameter A2 as the read voltage compensation parameter of the erased page checking operation from the first storage region 501 based on a type of a memory cell in the target page; and add a voltage compensation value corresponding to the read voltage compensation parameter of the erased page checking operation and a default read voltage to obtain a read voltage for performing the erased page checking operation.

In some examples, the peripheral circuit is configured such that: when the memory cell in the target page is the single-level cell, it may acquire the first voltage compensation parameter A1 from the first storage region 501 as the read voltage compensation parameter of the erased page checking operation; and when the memory cell in the target page is the multi-level cell, it may acquire the second voltage compensation parameter A2 from the first storage region 501 as the read voltage compensation parameter of the erased page checking operation. After the read voltage compensation parameter is acquired, a compensation value corresponding to the read voltage compensation parameter is added with the default read voltage to obtain the read voltage for performing the erased page checking operation. For example, the memory cell in the target page is the single-level cell, the first voltage compensation parameter A1 is 01h, the corresponding voltage compensation value is 10 mV, and when the default read voltage is 0 V, the read voltage for performing the erased page checking operation is 10 mV. For another example, the memory cell in the target page is the multi-level cell, the second voltage compensation parameter A2 is FEh, the corresponding voltage compensation value is −20 mV, and when the default read voltage is 0 V, the read voltage for performing the erased page checking operation is −20 mV.

It is to be noted that, in the above-mentioned examples, for example, the default read voltage is 0 V, but the present disclosure is not limited thereto, a value range of the default read voltage may be −1.5 V to 1.5 V, and may be the same as a read voltage when the memory device performs erase verification, but the default read voltage in one memory device only have one value.

In some examples, the read voltage for performing the erased page checking operation obtained by adding the voltage compensation value corresponding to the first voltage compensation parameter A1 and the default read voltage is higher than the read voltage for performing the erased page checking operation obtained by adding the voltage compensation value corresponding to the second voltage compensation parameter A2 and the default read voltage. It can be understood that, for the single-level cell, a voltage window between its erased state and programmed state is relatively large, and for the multi-level cell, a voltage window between its erased state and first programmed state is relatively small. Therefore, the read voltage distinguishing the erased state of the multi-level cell from the first programmed state is lower than the read voltage distinguishing the erased state of the single-level cell from the programmed state.

In some examples, FIG. 10 is a characteristic parameter table stored in the second storage region 502. As shown in FIG. 10, the second storage region 502 may store an enable flag parameter B1 and a fail bit allowance parameter B2, wherein a first bit B1[0] of the enable flag parameter B1 is used for identifying an enabled state of a Fail Bit Allowance (FBA) function. In an example, when B1[0] is 1, it indicates that the fail bit allowance function is enabled, and when B1[0] is 0, it indicates that the fail bit allowance function is not enabled. A value range of the fail bit allowance parameter B2 is 00h-FFh, with a total of 256 values, corresponding to a total number of 256 bits from Bit 0 to Bit 255.

In some examples, the peripheral circuit is configured to: in response to the second parameter setting command, receive the enable flag parameter B1 and the fail bit allowance parameter B2 of the erased page checking operation, and store the enable flag parameter B1 and the fail bit allowance parameter B2 to the second storage region 502.

In some examples, a process of performing parameter setting on the second storage region 502 is similar to the process of performing parameter setting on the first storage region 501. The peripheral circuit is configured to: receive a second parameter setting command EFh in the command cycle (CMD), and receive an address F9h of the second storage region 502 in the address cycle (ADDR); after the tADL, receive the enable flag parameter B1 and the fail bit allowance parameter B2 in the data input cycle (DIN); and after the tWB, store the enable flag parameter B1 and the fail bit allowance parameter B2 in the second storage region 502 within the tFEAT.

In some examples, when the enable flag parameter B1 indicates that the fail bit allowance function is enabled, the peripheral circuit is configured to: in response to the erased page checking command, acquire the first voltage compensation parameter A1 or the second voltage compensation parameter A2 as the read voltage compensation parameter of the erased page checking operation from the first storage region 501 based on a type of a memory cell in the target page; add a voltage compensation value corresponding to the read voltage compensation parameter of the erased page checking operation and a default read voltage to obtain a read voltage for performing the erased page checking operation; acquire the fail bit allowance parameter B2 of the erased page checking operation in the second storage region 502; apply the read voltage for the erased page checking operation to a word line corresponding to the target page, and obtain the number of fail bits of the target page; and determine a result of the erased page checking operation based on the number of fail bits of the target page and the fail bit allowance parameter B2, and send the result of the erased page checking operation.

In some examples, when the memory cell in the target page is the single-level cell, the number of fail bits of the target page may be equal to the number of the memory cells of which threshold voltage is higher than the read voltage for the erased page checking operation; and when the memory cell in the target page is the multi-level cell, e.g., TLC, the number of fail bits of the target page may be equal to three times the number of the memory cells of which threshold voltage is higher than the read voltage for the erased page checking operation.

In some examples, the peripheral circuit is configured to: determine the result of the erased page checking operation as not passed when the number of fail bits of the target page is greater than the number of bits corresponding to the fail bit allowance parameter; and determine the result of the erased page checking operation as passed when the number of fail bits of the target page is less than the number of bits corresponding to the fail bit allowance parameter.

It is to be noted that, in some other examples, when the enable flag parameter B1 indicates that the fail bit allowance function is not enabled, the result of the erased page checking operation of the target page is not passed, as long as in the target page there is a memory cell whose threshold voltage is higher than the read voltage for the erased page checking operation.

Figure 11:
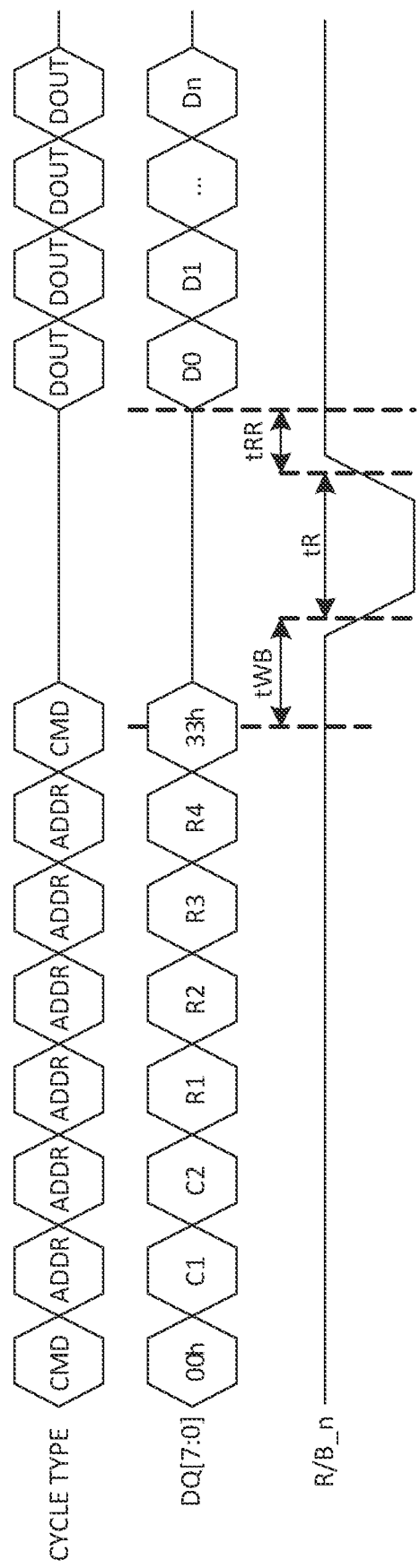
FIG. 11 is a timing diagram of performing an erased page checking operation provided by examples of the present disclosure.

In some examples, FIG. 11 is a timing diagram of performing the erased page checking operation. As shown in FIG. 11, the peripheral circuit may be configured to: receive erased page checking commands 00h and 33h in the command cycle (CMD), and receive column addresses (C1 and C2) and row addresses (R1, R2, R3, and R4) of the target page of the erased page checking operation in the address cycle (ADDR) between the command cycles (CMD); and after the tWB, perform the erased page checking operation within tR, comprising acquiring the characteristic parameter of the erased page checking operation from the characteristic parameter storage region, and obtaining the read voltage for the erased page checking operation; applying the read voltage for the erased page checking operation to the word line corresponding to the target page, and obtaining the number of fail bits of the target page; and determining the result of the erased page checking operation based on the number of fail bits of the target page and the fail bit allowance parameter B2, and sending data D0 to Dn indicating the result of the erased page checking operation in a data output cycle (DOUT) after tRR.

In some examples, the target page of the erased page checking operation is a page that is not programmed in the memory array. The peripheral circuit is configured to: perform the erased page checking operation on the target page to detect whether the target page is subjected to read disturbance. Before the erased page checking operation is performed, the first voltage compensation parameter A1 and the second voltage compensation parameter A2 in the first storage region 501 may be set in response to the first characteristic parameter setting command, and the voltage compensation value corresponding to the first voltage compensation parameter A1 and the voltage compensation value corresponding to the second voltage compensation parameter A2 are both negative values; and the enable flag parameter B1 and the fail bit allowance parameter B2 in the second storage region 502 are set in response to the second characteristic parameter setting command, and the fail bit allowance parameter B2 corresponds to the first number of bits. If the result of the erased page checking operation is not passed, the target page is a memory page that is subjected to read disturbance.

In some examples, the target page of the erased page checking operation is a memory page in a last programmed block in the memory array when power failure of the memory device occurs. The peripheral circuit is configured to: perform the erased page checking operation on the target page to judge whether the target page is a last programmed page when power failure of the memory device occurs. Before the erased page checking operation is performed, the first voltage compensation parameter A1 and the second voltage compensation parameter A2 in the first storage region 501 may be set in response to the first characteristic parameter setting command, and the voltage compensation value corresponding to the first voltage compensation parameter A1 and the voltage compensation value corresponding to the second voltage compensation parameter A2 are both positive values; and the enable flag parameter B1 and the fail bit allowance parameter B2 in the second storage region 502 are set in response to the second characteristic parameter setting command, and the fail bit allowance parameter B2 corresponds to the second number of bits. If the result of the erased page checking operation is not passed, the target page is the last programmed page when power failure of the memory device occurs.

In the examples of the present disclosure, when the target page of the erased page checking operation is the page that is not programmed in the memory array, the voltage compensation value corresponding to the first voltage compensation parameter A1 and the voltage compensation value corresponding to the second voltage compensation parameter A2 are both negative values, e.g., the read voltage for the erased page checking operation is lower than the default read voltage; and when the target page of the erased page checking operation is the memory page in the last programmed block in the array when power failure of the memory device occurs, the voltage compensation value corresponding to the first voltage compensation parameter A1 and the voltage compensation value corresponding to the second voltage compensation parameter A2 are both positive values, e.g., the read voltage for the erased page checking operation is higher than the default read voltage. In addition, the second number of bits is greater than the first number of bits. That is, when the target page of the erased page checking operation is the page that is not programmed in the memory array, the read voltage for performing the erased page checking operation is lower, and the first number of bits corresponding to the fail bit allowance parameter B2 is relatively small; and when the target page of the erased page checking operation is the memory page in the last programmed block when power failure of the memory device occurs, the read voltage for performing the erased page checking operation is higher, and the second number of bits corresponding to the fail bit allowance parameter B2 is relatively large. The two situations are described below in conjunction with the schematic diagram of distribution of the threshold voltages.

Figure 12:
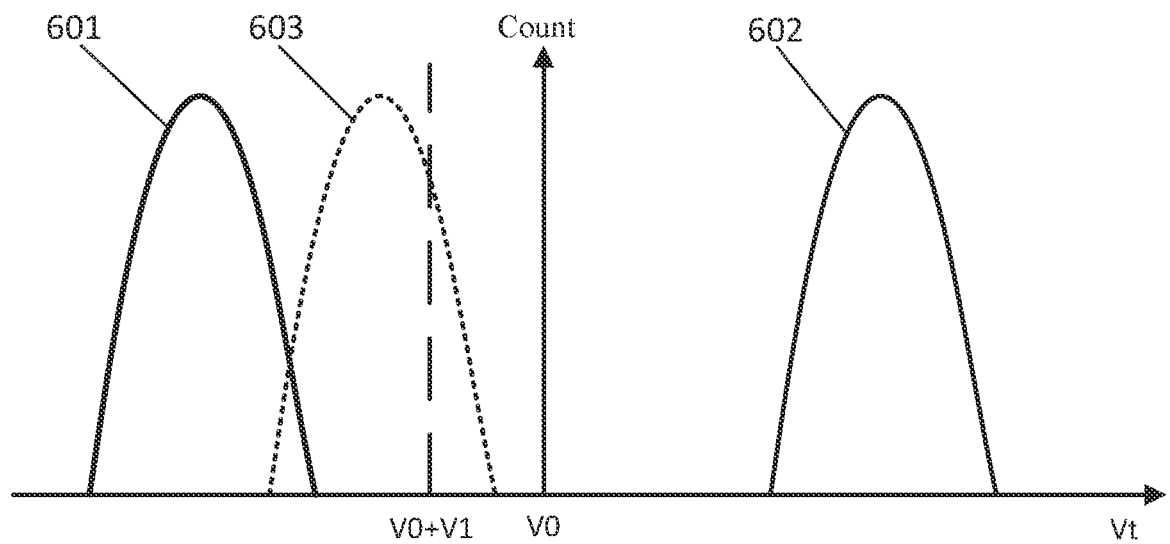
FIG. 12 is a schematic diagram I of distribution of threshold voltages of memory cells in a memory page provided by examples of the present disclosure.

FIG. 12 is a schematic diagram I of distribution of threshold voltages of memory cells in a memory page. Herein, by using the memory cell being the single-level cell as an example, a curve 601 is a threshold voltage distribution curve when the memory cells in the memory page are all in an erased state, a curve 602 is a threshold voltage distribution curve when the memory cells in the memory page are all in a programmed state, and a curve 603 is a threshold voltage distribution curve after the memory cells in the memory page are subjected to read disturbance. As shown in FIG. 12, when the target cell is a read disturbance page, the threshold voltage of the memory cell in the target page drifts positively, but its threshold voltage may still be lower than the default read voltage V0. In this case, if the default read voltage V0 is used to perform the erased page checking operation on the target page, the result of the erased page checking operation is passed, e.g., the target page is not subjected to read disturbance, causing a detection result of the read disturbance page to be inaccurate. Therefore, the voltage compensation value V1 corresponding to the first voltage compensation parameter A1 shall be a negative value, and the read voltage V0+V1 for performing the erased page checking operation shall be lower than the default read voltage V0. In addition, the first number of bits corresponding to the fail bit allowance parameter B2 is relatively small, e.g., the result of the erased page checking operation is not passed as long as the threshold voltages of a small number of the memory cells in the target page are higher than the read voltage V0+V1 for performing the erased page checking operation, therefore, the accuracy of detecting the read disturbance page may be improved.

Figure 13:
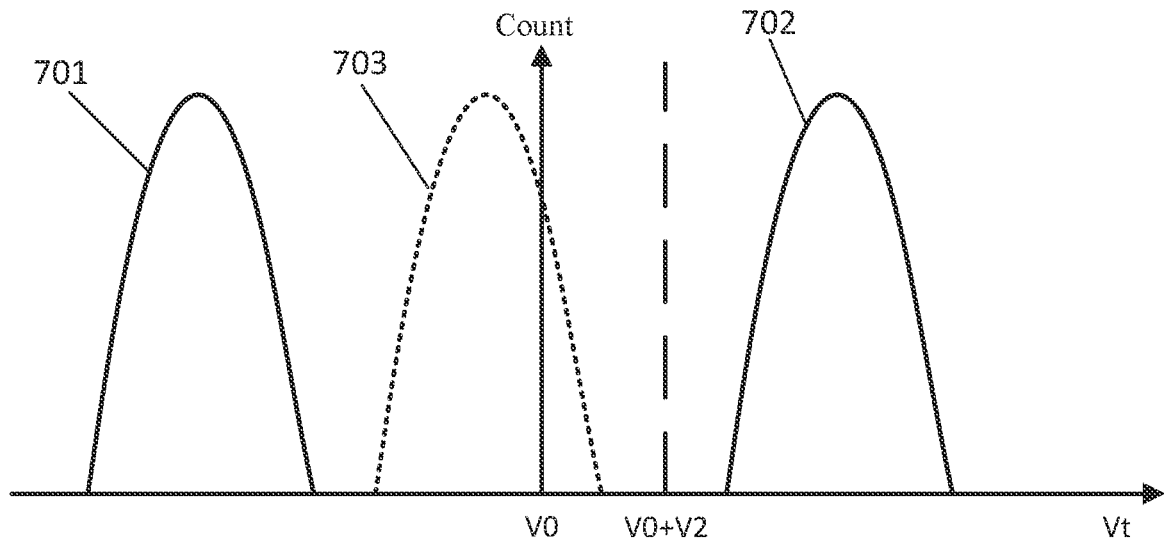
FIG. 13 is a schematic diagram II of distribution of threshold voltages of memory cells in a memory page provided by examples of the present disclosure.

FIG. 13 is a schematic diagram II of distribution of threshold voltages of memory cells in a memory page. Herein, a curve 701 is a threshold voltage distribution curve when the memory cells in the memory page are all in the erased state, a curve 702 is a threshold voltage distribution curve of the memory cells in the last programmed page when power failure of the memory device occurs, and a curve 703 is a threshold voltage distribution curve of the memory cells in a virtually-programmed memory page after power failure of the memory device occurs. As shown in FIG. 13, when power failure of the memory device occurs, the memory device may utilize remaining power to perform a virtual program operation on a plurality of unprogrammed pages adjacent to the last programmed page, a threshold voltage of a memory cell in the virtually-programmed memory page is slightly higher than the threshold voltage of the memory cell in the erased state, but is lower than the threshold voltage of the memory cell in the last programmed page. In this case, if the default read voltage V0 is used to perform the erased page checking operation on the target page, the virtually-programmed memory page cannot be distinguished from the last programmed page, e.g., the last programmed page cannot be accurately positioned. Therefore, the voltage compensation value V2 corresponding to the first voltage compensation parameter A1 shall be a positive value, and the read voltage V0+V2 for performing the erased page checking operation shall be higher than the default read voltage V0, such that the virtually-programmed memory page may be distinguished from the last programmed page. In addition, the second number of bits corresponding to the fail bit allowance parameter B2 is relatively large, e.g., the result of the erased page checking operation is not passed only when the threshold voltages of a large number of the memory cells in the target page are higher than the read voltage V0+V2 for performing the erased page checking operation, e.g., the target page is determined as the last programmed page. Therefore, the accuracy of searching for the last programmed page when power failure of the memory device occurs may be improved.

In the examples of the present disclosure, the memory device comprises the characteristic parameter storage region. The peripheral circuit is configured to: in response to the characteristic parameter setting command, receive the characteristic parameter of the erased page checking operation and store the characteristic parameter of the erased page checking operation to the characteristic parameter storage region; and in response to the erased page checking command, perform the erased page checking operation on the memory array based on the characteristic parameter of the erased page checking operation in the characteristic parameter storage region. The characteristic parameter of the erased page checking operation, including a voltage compensation characteristic parameter and the fail bit allowance parameter, may be adjusted based on different application situations; when the target page is the memory page that is not programmed, the voltage compensation value corresponding to the voltage compensation characteristic parameter is the negative value, the read voltage for performing the erased page checking operation may be lower than the default read voltage, and the first number of bits corresponding to the fail bit allowance parameter is smaller, such that the accuracy of detecting the read disturbance page may be improved; and when the target page is the memory page in the last programmed block when power failure of the memory device occurs, the voltage compensation value corresponding to the voltage compensation characteristic parameter is the positive value, the read voltage for performing the erased page checking operation may be higher than the default read voltage, and the second number of bits corresponding to the fail bit allowance parameter is large, such that the accuracy of searching for the last programmed page when power failure of the memory device occurs may be improved. Therefore, the flexibility of the erased page checking operation may be improved to make the erased page checking operation able to be applied to different scenarios, and the reliability of the memory device may also be improved without increasing an area of a logic circuit.

Figure 14:
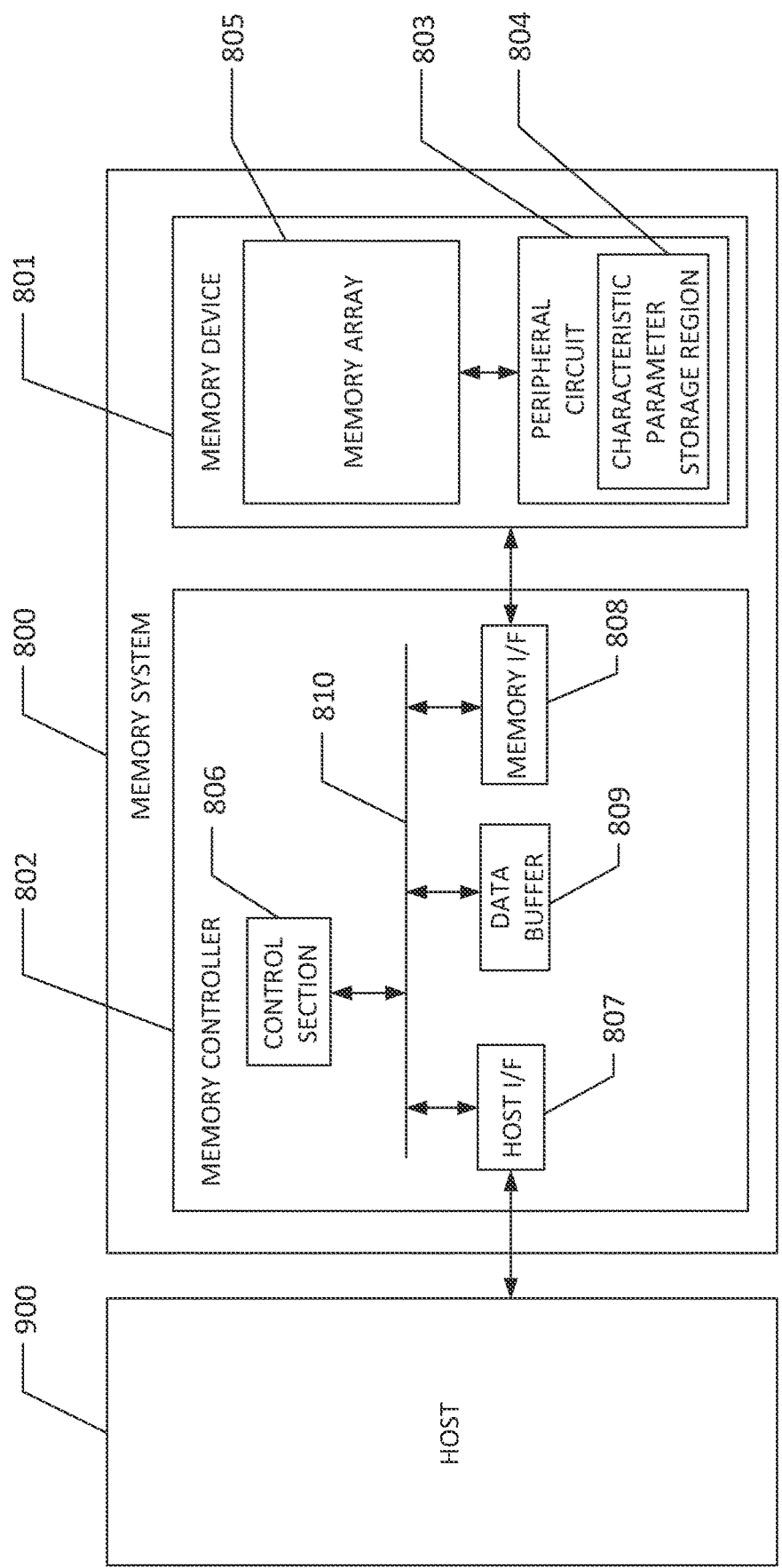
FIG. 14 is a schematic diagram of a memory system provided by examples of the present disclosure.

The present disclosure further provides a memory system. FIG. 14 is a schematic diagram of a memory system provided by examples of the present disclosure. As shown in FIG. 14, the memory system 800 comprises at least one memory device 801 and a memory controller 802 coupled with the memory device 801. Herein, the memory device 801 may be the memory device in any one of the above-mentioned examples.

In some examples, the memory controller 802 is configured to: receive a characteristic parameter of an erased page checking operation from a host 900, and send the characteristic parameter of the erased page checking operation and a characteristic parameter setting command to the memory device 801, wherein the characteristic parameter of the erased page checking operation comprises at least a read voltage compensation parameter of the erased page checking operation. The memory device 801 is configured to, in response to the characteristic parameter setting command, receive the characteristic parameter of the erased page checking operation.

In some examples, the memory controller 802 is further configured to: send an erased page checking command to the memory device 801. The memory device 801 is further configured to, in response to the erased page checking command, perform the erased page checking operation based on the characteristic parameter of the erased page checking operation, and send a result of the erased page checking operation to the memory controller 802.

In some examples, the memory device 801 is further configured to: after receiving the characteristic parameter of the erased page checking operation, store the characteristic parameter of the erased page checking operation to a characteristic parameter storage region 804 in the memory device 801; and in response to the erased page checking command, perform the erased page checking operation on a memory array 805 based on the characteristic parameter of the erased page checking operation in the characteristic parameter storage region 804. Herein, the characteristic parameter storage region 804 may be the same as the characteristic parameter storage region 500 shown in FIG. 6.

In the examples of the present disclosure, a user or the host 900 may set the characteristic parameter of the erased page checking operation in the memory device 801 according to different application scenarios. In an example, the host 900 may send the characteristic parameter of the erased page checking operation to the memory controller 802 of the memory system 800 according to different application scenarios. A host I/F 807 of the memory controller 802 may receive the characteristic parameter of the erased page checking operation. A control section 806 may cache the characteristic parameter of the erased page checking operation in a data buffer 809. The control section 806 may send the characteristic parameter setting command (EFh) and the characteristic parameter of the erased page checking operation to the memory device 801 via a memory I/F 808. The memory device 801 may receive the characteristic parameter of the erased page checking operation in response to the characteristic parameter setting command and store the characteristic parameter to the characteristic parameter storage region 804. Similarly, the user may directly set the characteristic parameter of the erased page checking operation, and send the characteristic parameter of the erased page checking operation to the memory system 800 via the host 900.

In some examples, a target page of the erased page checking operation is a memory page that is not programmed in the memory device 801. The memory controller 802 is further configured to send to the memory device 801 a read voltage compensation parameter that corresponds to a voltage compensation value that is a negative value.

In some examples, the target page of the erased page checking operation is a memory page in a last programmed block in the memory device 801 when power failure occurs. The last programmed block is a memory block that is undergoing a program operation when power failure of the memory device 801 occurs. The memory controller 802 is further configured to send, to the memory device 801, a read voltage compensation parameter that corresponds to a voltage compensation value that is a positive value.

In some examples, the memory controller 802 is further configured to: when the target page of the erased page checking operation is the memory page that is not programmed in the memory device 801, send a fail bit allowance parameter corresponding to the first number of bits to the memory device 801; and when the target page is the memory page in the last programmed block in the memory device 801 when power failure occurs, send a fail bit allowance parameter corresponding to the second number of bits to the memory device 801, wherein the second number of bits is greater than the first number of bits.

In the examples of the present disclosure, the characteristic parameter of the erased page checking operation comprises the read voltage compensation parameter and the fail bit allowance parameter, wherein the read voltage compensation parameter may comprise a first voltage compensation parameter A1 and a second voltage compensation parameter A2, with the value comparison table being shown in FIG. 8; when the target page of the erased page checking operation is the memory page that is not programmed in the memory device 801, a value range may be 80h -FFh, and corresponding voltage compensation values are all negative values; and when the target page of the erased page checking operation is the memory page in the last programmed block in the memory device 801 when power failure occurs, a value range may be 01h-7Fh, and corresponding voltage compensation values are all positive values. A value range of the fail bit allowance parameter may be 00h-FFh, with a total of 256 values, corresponding to a total number of 256 bits from Bit 0 to Bit 255. When the target page of the erased page checking operation is the memory page that is not programmed in the memory device 801, the fail bit allowance parameter corresponds to the first number of bits; when the target page of the erased page checking operation is the memory page in the last programmed block in the memory device 801 when power failure occurs, the fail bit allowance parameter corresponds to the second number of bits; and the second number of bits is greater than the first number of bits.

In some examples, the memory controller 802 is configured to: determine the target page as a read disturbance page when the target page of the erased page checking operation is the memory page that is not programmed in the memory device 801 and the target page does not pass the erased page checking operation; and before sending a command indicating the performing of a program operation on the read disturbance page, send a command indicating the performing of an erase operation on the read disturbance page.

In some examples, the memory controller 802 is configured to: determine the target page as a last programmed page when power failure occurs, when the target page of the erased page checking operation is the memory page in the last programmed block in the memory device 801 when power failure occurs and the target page does not pass the erased page checking operation; and send a command indicating reprogramming of the last programmed page when power failure occurs.

In the examples of the present disclosure, after performing the erased page checking operation, the memory device 801 sends a result of the erased page checking operation to the memory controller 802. In one case, the target page of the erased page checking operation is the memory page that is not programmed in the memory device, and the memory controller 802 may determine, based on the result of the erased page checking operation, whether the target page is the read disturbance page. In an example, when the target page does not pass the erased page checking operation, the target page may be determined as the read disturbance page, and before a command indicating performing of a program operation on the read disturbance page is sent, a command indicating performing of an erase operation on the read disturbance page is sent, then the memory device 801 may perform the erase operation on the read disturbance page before performing the program operation on the read disturbance page, such that program errors caused by read disturbance may be avoided. In the other case, the target page of the erased page checking operation is the memory page in the memory block undergoing the program operation when power failure of the memory device 801 occurs, and the memory controller 802 may determine, based on the result of the erased page checking operation, whether the target page is the last programmed page when power failure occurs. In an example, when the target page does not pass the erased page checking operation, the target page may be determined as the last programmed page when power failure occurs, and a command indicating performing of reprogram on the last programmed page when power failure occurs is sent, then the memory device 801 may perform the reprogram operation on the last programmed page, and the reprogram operation may comprise first performing the erase operation on the last programmed page and then performing the program operation on the last programmed page, or first performing a program verification operation on the last programmed page and then performing the program operation on the last programmed page, such that program errors caused by sudden power failure may be avoided.

In the examples of the present disclosure, the memory device in the memory system comprises the characteristic parameter storage region, and a user or a host may set the characteristic parameter of the erased page checking operation in the characteristic parameter storage region according to different situations, such that the memory system may not only detect the read disturbance page by utilizing the erased page checking operation, but also search the last programmed page when power failure occurs by utilizing the erased page checking operation, and logic circuits coping with each situation do not need to be added in the memory device, thereby not generating a negative impact on the miniaturization development of the memory device while the reliability of the memory system is improved.

The present disclosure provides an electronic apparatus comprising: the memory system in any one of the above-mentioned examples; and a host coupled with the memory system and configured to send a characteristic parameter of an erased page checking operation to the memory system.

Functions and effects that can be realized by the memory system in any one of the above-mentioned examples can all be realized by the electronic apparatus and are not repeated here.

Figure 15:
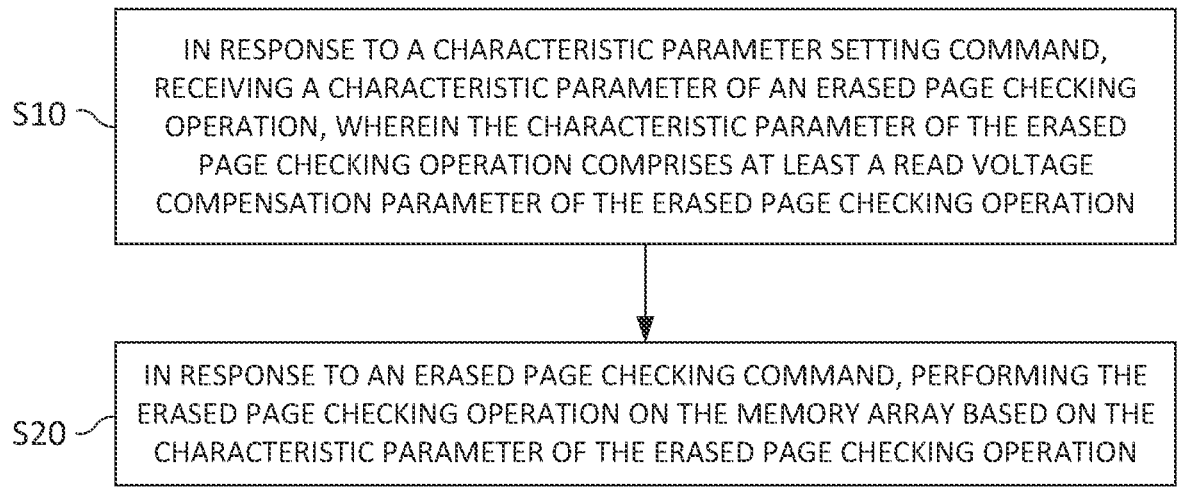
FIG. 15 is a flow diagram of an operation method of a memory device provided by examples of the present disclosure.

Based on a similar conception to the memory device in the above-mentioned examples, the present disclosure further provides an operation method of a memory device. FIG. 15 is a flow diagram of an operation method of a memory device provided by examples of the present disclosure. As shown in FIG. 15, the operation method of a memory device comprises the following operations:

S10: in response to a characteristic parameter setting command, receiving a characteristic parameter of an erased page checking operation, wherein the characteristic parameter of the erased page checking operation comprises at least a read voltage compensation parameter of the erased page checking operation; and S20: in response to an erased page checking command, performing the erased page checking operation on the memory array based on the characteristic parameter of the erased page checking operation.

In some examples, referring to FIGS. 6 and 15 in combination, the operation method of a memory device further comprises: after performing the operation S10, storing the characteristic parameter of the erased page checking operation to a characteristic parameter storage region 500 in a memory device. An example process of performing the operation S20 may comprise: in response to the erased page checking command, performing the erased page checking operation on the memory array based on the characteristic parameter of the erased page checking operation in the characteristic parameter storage region 500.

In some examples, referring to FIGS. 6, 7, 9, and 15 in combination, the characteristic parameter setting command comprises a first parameter setting command (EFh). A process of performing the operation S10 may comprise: in response to the first parameter setting command (EFh), receiving a first voltage compensation parameter A1 and a second voltage compensation parameter A2, wherein the first voltage compensation parameter A1 comprises a read voltage compensation parameter performing the erased page checking operation on a single-level cell, and the second voltage compensation parameter A2 comprises a read voltage compensation parameter performing the erased page checking operation on a multi-level cell; and storing the first voltage compensation parameter A1 and the second voltage compensation parameter A2 to a first storage region 501 in the characteristic parameter storage region 500.

In some examples, referring to FIGS. 6, 10, and 15 in combination, the process of performing the operation S10 further comprises: in response to a second parameter setting command, receiving a fail bit allowance parameter B2 of the erased page checking operation, and storing the fail bit allowance parameter B2 of the erased page checking operation to a second storage region 502 in the characteristic parameter storage region 500. Herein, the second parameter setting command and the first parameter setting command may be the same, and both are EFh. A difference lies in that, in response to the first parameter setting command, a received address and data respectively are an address (CAh) of the first storage region 501 and the read voltage compensation parameter; and in response to the second parameter setting command, a received address and data respectively are an address (F9h) of the second storage region 502 and the fail bit allowance parameter.

In some examples, the process of performing the operation S20 may comprise: receiving the erased page checking command performing the erased page checking operation on a target page, wherein the target page is a memory page that is not programmed in the memory array or a memory page in a last programmed block in the memory array when power failure of the memory device occurs, and the last programmed block is a memory block that is undergoing a program operation when power failure of the memory device occurs; in response to the erased page checking command, acquiring the first voltage compensation parameter A1 or the second voltage compensation parameter A2 as the read voltage compensation parameter of the erased page checking operation from the first storage region 501 based on a type of a memory cell in the target page; and adding a voltage compensation value corresponding to the read voltage compensation parameter of the erased page checking operation and a default read voltage to obtain a read voltage for performing the erased page checking operation. Herein, when the memory cell in the target page is the single-level cell, the first voltage compensation parameter A1 is acquired from the first storage region 501 as the read voltage compensation parameter of the erased page checking operation; and when the memory cell in the target page is the multi-level cell, the second voltage compensation parameter A2 is acquired from the first storage region 501 as the read voltage compensation parameter of the erased page checking operation.

In some examples, referring to FIGS. 11 and 15 in combination, the process of performing the operation S20 may comprise: receiving erased page checking commands 00h and 33h in the command cycle (CMD), and receiving column addresses (C1 and C2) and row addresses (R1, R2, R3, and R4) of the target page of the erased page checking operation in the address cycle (ADDR) between the command cycles (CMD); and after the tWB, performing the erased page checking operation within tR, comprising acquiring the characteristic parameter of the erased page checking operation from the characteristic parameter storage region, and obtaining the read voltage for the erased page checking operation; applying the read voltage for the erased page checking operation to the word line corresponding to the target page, and obtaining the number of fail bits of the target page; and determining the result of the erased page checking operation based on the number of fail bits of the target page and the fail bit allowance parameter B2, and sending data D0 to Dn indicating the result of the erased page checking operation in a data output cycle (DOUT) after tRR.

In some examples, the process of performing the operation S20 further comprises: in response to the erased page checking command, acquiring the fail bit allowance parameter B2 of the erased page checking operation in the second storage region; applying the read voltage for the erased page checking operation to a word line corresponding to the target page, and obtaining the number of fail bits of the target page; and determining a result of the erased page checking operation based on the number of fail bits of the target page and the fail bit allowance parameter B2, and sending the result of the erased page checking operation. Herein, when an enable flag parameter B1 indicates that a fail bit allowance function is not enabled, the result of the erased page checking operation is determined based on the number of fail bits of the target page and the fail bit allowance parameter B2.

In some examples, the result of the erased page checking operation is determined as not passed when the number of fail bits of the target page is greater than the number of bits corresponding to the fail bit allowance parameter; and the result of the erased page checking operation is determined as passed when the number of fail bits of the target page is less than the number of bits corresponding to the fail bit allowance parameter.

In the examples of the present disclosure, the operation method of a memory device in the above-mentioned examples may be respectively applied to two situations of detecting the read disturbance page and searching for the last programmed page when power failure occurs, e.g., a detection process for the read disturbance page through the erased page checking operation and a search process for the last programmed page when power failure occurs are similar, and may both comprise setting parameters of the erased page checking operation in response to the parameter setting command, and performing the erased page checking operation in response to the erased page checking command. When the purpose of the erased page checking operation is to detect the read disturbance page, the voltage compensation value corresponding to the read voltage compensation parameter of the erased page checking operation is a negative value, and the number of bits corresponding to the fail bit allowance parameter is relatively small; and when the purpose of the erased page checking operation is to search for the last programmed page when power failure occurs, the voltage compensation value corresponding to the read voltage compensation parameter of the erased page checking operation is a positive value, and the number of bits corresponding to the fail bit allowance parameter is relatively large. Therefore, the flexibility of the erased page checking operation may be improved.

Figure 16:
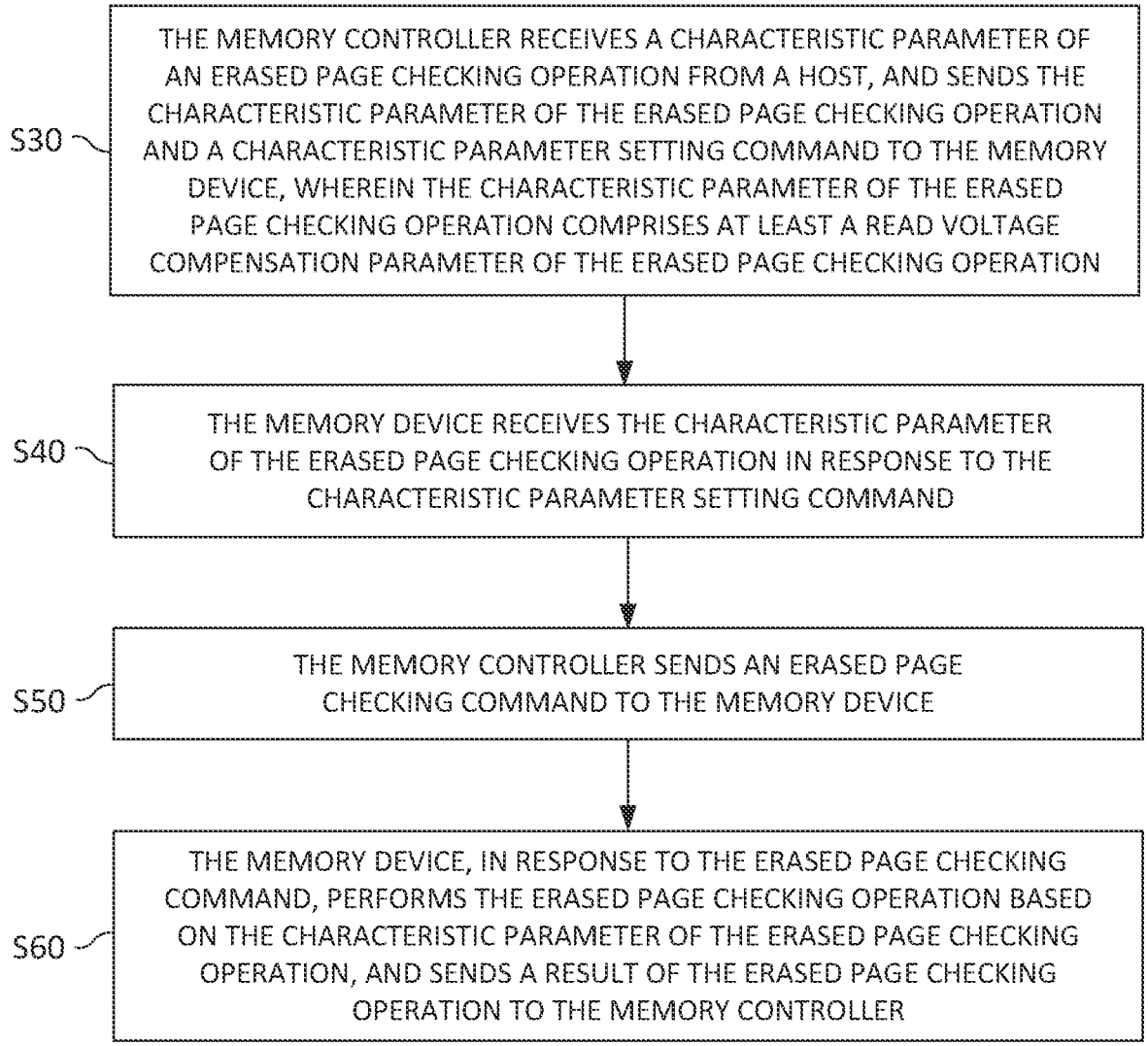
FIG. 16 is a flow diagram of an operation method of a memory system provided by examples of the present disclosure.

Based on a similar conception to the memory system in the above-mentioned examples, the present disclosure further provides an operation method of a memory system. FIG. 16 is a flow diagram of an operation method of a memory system provided by examples of the present disclosure. As shown in FIG. 16, the operation method of a memory system comprises the following operations:

S30: the memory controller receives a characteristic parameter of an erased page checking operation from a host, and sends the characteristic parameter of the erased page checking operation and a characteristic parameter setting command to the memory device, wherein the characteristic parameter of the erased page checking operation comprises at least a read voltage compensation parameter of the erased page checking operation;

S40: the memory device receives the characteristic parameter of the erased page checking operation in response to the characteristic parameter setting command;

S50: the memory controller sends an erased page checking command to the memory device; and S60: the memory device, in response to the erased page checking command, performs the erased page checking operation based on the characteristic parameter of the erased page checking operation, and sends a result of the erased page checking operation to the memory controller.

Functions and effects that can be realized by the memory system in any one of the above-mentioned examples can be realized by the operation method of the memory system and are not repeated here.

The characteristics disclosed in several device examples provided in the present disclosure may be combined arbitrarily without conflict to obtain a new device example.

The methods disclosed in several method implementations provided by the present disclosure can be combined arbitrarily without conflict to obtain a new method implementation.

The above is only the example implementations of the present disclosure and not intended to limit the scope of protection of the present disclosure. Any variations or replacements apparent to those skilled in the art within the technical scope disclosed by the present disclosure shall fall within the protection scope of the present disclosure.

What is claimed is:

1. A memory device, comprising:
   a memory array; and
   a peripheral circuit coupled with the memory array and configured to:
   in response to a characteristic parameter setting command, receive a characteristic parameter of an erased page checking operation, wherein the characteristic parameter of the erased page checking operation comprises at least a read voltage compensation parameter of the erased page checking operation; and
   in response to an erased page checking command, perform the erased page checking operation on the memory array based on the characteristic parameter of the erased page checking operation.

2. The memory device of claim 1, comprising a characteristic parameter storage region, wherein the characteristic parameter storage region is located in the memory array or in the peripheral circuit; and the peripheral circuit is configured to:
   after receiving the characteristic parameter of the erased page checking operation, store the characteristic parameter of the erased page checking operation to the characteristic parameter storage region; and
   in response to the erased page checking command, perform the erased page checking operation on the memory array based on the characteristic parameter of the erased page checking operation in the characteristic parameter storage region.

3. The memory device of claim 2, wherein the characteristic parameter storage region comprises a first storage region; the characteristic parameter setting command comprises a first parameter setting command; and the peripheral circuit is configured to:
   in response to the first parameter setting command, receive a first voltage compensation parameter and a second voltage compensation parameter, wherein the first voltage compensation parameter comprises a read voltage compensation parameter for performing the erased page checking operation on a single-level cell, and the second voltage compensation parameter comprises a read voltage compensation parameter for performing the erased page checking operation on a multi-level cell; and
   store the first voltage compensation parameter and the second voltage compensation parameter to the first storage region.

4. The memory device of claim 3, wherein the peripheral circuit is configured to:
   receive the erased page checking command for performing the erased page checking operation on a target page, wherein the target page is a memory page that is not programmed in the memory array or a memory page in a last programmed block in the memory array when power failure of the memory device occurs, and the last programmed block is a memory block that is undergoing a program operation when power failure of the memory device occurs;
   in response to the erased page checking command, acquire the first voltage compensation parameter or the second voltage compensation parameter as the read voltage compensation parameter of the erased page checking operation from the first storage region based on a type of a memory cell in the target page; and
   add a voltage compensation value corresponding to the read voltage compensation parameter of the erased page checking operation and a default read voltage to obtain a read voltage for performing the erased page checking operation.

5. The memory device of claim 4, wherein the target page is the memory page that is not programmed in the memory array; and a voltage compensation value corresponding to the first voltage compensation parameter and a voltage compensation value corresponding to the second voltage compensation parameter both are negative values.

6. The memory device of claim 4, wherein the target page is the memory page in the last programmed block in the memory array when power failure of the memory device occurs; and a voltage compensation value corresponding to the first voltage compensation parameter and a voltage compensation value corresponding to the second voltage compensation parameter both are positive values.

7. The memory device of claim 4, wherein the characteristic parameter of the erased page checking operation further comprises a fail bit allowance parameter of the erased page checking operation; the characteristic parameter storage region further comprises a second storage region; the characteristic parameter setting command further comprises a second parameter setting command; and the peripheral circuit is further configured to:
   in response to the second parameter setting command, receive the fail bit allowance parameter of the erased page checking operation, and store the fail bit allowance parameter of the erased page checking operation to the second storage region.

8. The memory device of claim 7, wherein when the target page is the memory page that is not programmed in the memory array, the fail bit allowance parameter corresponds to a first number of bits; when the target page is the memory page in the last programmed block in the memory array when power failure of the memory device occurs, the fail bit allowance parameter corresponds to a second number of bits; and the second number of bits is greater than the first number of bits.

9. The memory device of claim 7, wherein the peripheral circuit is further configured to:
   in response to the erased page checking command, acquire the fail bit allowance parameter of the erased page checking operation in the second storage region;
   apply the read voltage for the erased page checking operation to a word line corresponding to the target page, and obtain a number of fail bits of the target page; and
   determine a result of the erased page checking operation based on the number of fail bits of the target page and the fail bit allowance parameter, and send the result of the erased page checking operation.

10. The memory device of claim 2, wherein the characteristic parameter storage region is located in the peripheral circuit, and the characteristic parameter storage region comprises a plurality of registers.

11. A memory system, comprising:
at least one memory device; and
a memory controller coupled with the memory device, wherein:
the memory controller is configured to: receive a characteristic parameter of an erased page checking operation from a host, and send the characteristic parameter of the erased page checking operation and a characteristic parameter setting command to the memory device, wherein the characteristic parameter of the erased page checking operation comprises at least a read voltage compensation parameter of the erased page checking operation;
the memory device is configured to, in response to the characteristic parameter setting command, receive the characteristic parameter of the erased page checking operation;
the memory controller is further configured to send an erased page checking command to the memory device; and
the memory device is further configured to, in response to the erased page checking command, perform the erased page checking operation based on the characteristic parameter of the erased page checking operation, and send a result of the erased page checking operation to the memory controller.

12. The memory system of claim 11, wherein the memory device is further configured to:
after receiving the characteristic parameter of the erased page checking operation, store the characteristic parameter of the erased page checking operation to a characteristic parameter storage region in the memory device; and
in response to the erased page checking command, perform the erased page checking operation on the memory device based on the characteristic parameter of the erased page checking operation in the characteristic parameter storage region.

13. The memory system of claim 11, wherein a target page of the erased page checking operation is a memory page that is not programmed in the memory device; and the memory controller is further configured to:
send, to the memory device, a read voltage compensation parameter that corresponds to a voltage compensation value that is a negative value.

14. The memory system of claim 11, wherein a target page of the erased page checking operation is a memory page in a last programmed block in the memory device when power failure occurs; the last programmed block is a memory block that is undergoing a program operation when power failure of the memory device occurs; and memory controller is further configured to:
send, to the memory device, a read voltage compensation parameter that corresponds to a voltage compensation value that is a positive value.

15. The memory system of claim 14, wherein the memory controller is further configured to:
when the target page of the erased page checking operation is the memory page that is not programmed in the memory device, send, to the memory device, a fail bit allowance parameter corresponding to a first number of bits; and
when the target page is the memory page in the last programmed block in the memory device when power failure occurs, send, to the memory device, a fail bit allowance parameter corresponding to a second number of bits, wherein the second number of bits is greater than the first number of bits.

16. The memory system of claim 14, wherein the memory controller is configured to:
determine the target page as a read disturbance page when the target page of the erased page checking operation is the memory page that is not programmed in the memory device and the target page does not pass the erased page checking operation; and
before sending a command indicating the performing of a program operation on the read disturbance page, send a command indicating the performing of an erase operation on the read disturbance page.

17. The memory system of claim 14, wherein the memory controller is configured to:
determine the target page as a last programmed page when power failure occurs, when the target page of the erased page checking operation is the memory page in the last programmed block in the memory device when power failure occurs and the target page does not pass the erased page checking operation; and
send a command indicating reprogramming of the last programmed page when power failure occurs.

18. An operation method of a memory device, wherein the memory device comprises a memory array and a peripheral circuit coupled with the memory array; and the operation method comprises:
in response to a characteristic parameter setting command, receiving a characteristic parameter of an erased page checking operation, wherein the characteristic parameter of the erased page checking operation comprises at least a read voltage compensation parameter of the erased page checking operation; and
in response to an erased page checking command, performing the erased page checking operation on the memory array based on the characteristic parameter of the erased page checking operation.

19. The operation method of claim 18, further comprising:
after receiving the characteristic parameter of the erased page checking operation, storing the characteristic parameter of the erased page checking operation to a characteristic parameter storage region in the memory device; and
in response to the erased page checking command, performing the erased page checking operation on the memory array based on the characteristic parameter of the erased page checking operation in the characteristic parameter storage region.

20. The operation method of claim 19, wherein the characteristic parameter setting command comprises a first parameter setting command; and in response to the characteristic parameter setting command, receiving the characteristic parameter of the erased page checking operation and storing the characteristic parameter of the erased page checking operation to the characteristic parameter storage region comprises:
in response to the first parameter setting command, receiving a first voltage compensation parameter and a second voltage compensation parameter, wherein the first voltage compensation parameter comprises a read voltage compensation parameter for performing the erased page checking operation on a single-level cell, and the second voltage compensation parameter comprises a read voltage compensation parameter for performing the erased page checking operation on a multi-level cell; and storing the first voltage compensation parameter and the second voltage compensation parameter to a first storage region in the characteristic parameter storage region.

\* \* \* \* \*